United States Patent [19]

Menich et al.

[11] Patent Number: 4,843,633
[45] Date of Patent: Jun. 27, 1989

[54] INTERFACE METHOD AND APPARATUS FOR A CELLULAR SYSTEM SITE CONTROLLER

[75] Inventors: Barry J. Menich, Chicago; Daniel E. Wood, Algonquin; Daniel R. Tayloe, Rolling Meadows; Jeff D. Bonta, Arlington Heights; Valy Lev, Schaumburg, all of Ill.

[73] Assignee: Motorola, Inc., Schaumburg, Ill.

[21] Appl. No.: 130,855

[22] Filed: Dec. 9, 1987

Related U.S. Application Data

[62] Division of Ser. No. 830,390, Jan. 18, 1986, Pat. No. 4,730,187.

[51] Int. Cl.[4] .............................................. H04B 7/00
[52] U.S. Cl. ........................................ 455/33; 455/52; 455/54
[58] Field of Search ............... 455/2, 68, 52, 33, 54, 455/67, 69; 379/59, 60

[56] References Cited

U.S. PATENT DOCUMENTS

| | | |
|---|---|---|
| 3,663,762 | 5/1972 | Joel et al. |
| 3,819,872 | 6/1974 | Hamrick |
| 3,898,390 | 8/1975 | Wells et al. |
| 3,906,166 | 9/1975 | Cooper et al. |
| 4,268,722 | 5/1981 | Little et al. |
| 4,475,010 | 10/1984 | Huensch et al. |
| 4,485,486 | 11/1984 | Webb et al. |
| 4,491,966 | 1/1985 | Moroerf et al. |
| 4,613,990 | 9/1986 | Halper ........................... 455/54 |
| 4,669,107 | 5/1987 | Eriksson ........................ 455/33 |
| 4,759,051 | 7/1988 | Han ............................... 455/33 |

OTHER PUBLICATIONS

Motorola, Inc., "DYNA T*A*C*"™ System Description, Instruction Manual No. 68P81150E01-0, Mar. 1983, pp. 14-24.

Ehrlich et al., "Cell-Site Hardware", Bell System Technical Journal, vol. 58, No. 1, Jan. 1979, pp. 153-199.

Tandem Computers Incorporated, "Introduction to Tandem Computer Systems", Dec. 1983, pp. 2-3, 2-6, 2-16, 3-5, 3-6, 8-1, 8-2.

Motorola, Inc., "Fixed Network Equipment"-Instruction Manual No. 68P81053E50, Apr. 1984, pp. E51A (1-5) and E53A (1-24).

Primary Examiner—Robert L. Griffin
Assistant Examiner—Curtis Kuntz
Attorney, Agent, or Firm—Raymond A. Jenski; Rolland R. Hackbart

[57] ABSTRACT

The method of conveying control and program information between cellular radiotelephone controllers and of detecting information errors is disclosed. When a program memory information error is detected, a predetermined amount of memory information is conveyed from a first controller to a second controller. If a comparison of checksums of a predetermined amount of memory information stored at the second controller and the memory information received from the first controller matches, additional memory information is conveyed. If a match is not found, the predetermined amount of memory information is reconveyed from the first controller to the second controller.

4 Claims, 21 Drawing Sheets

—PRIOR ART—

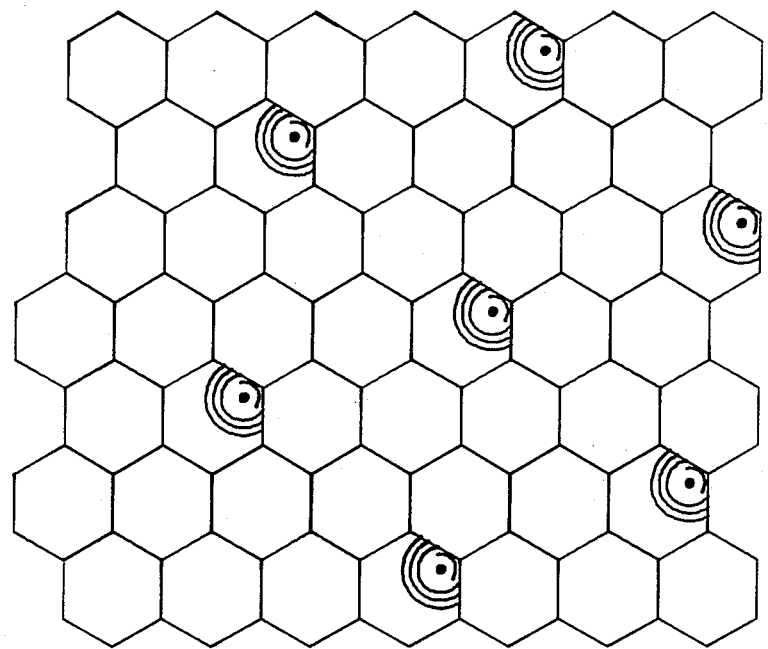
Fig. 2 —PRIOR ART—
Fig. 3 —PRIOR ART—
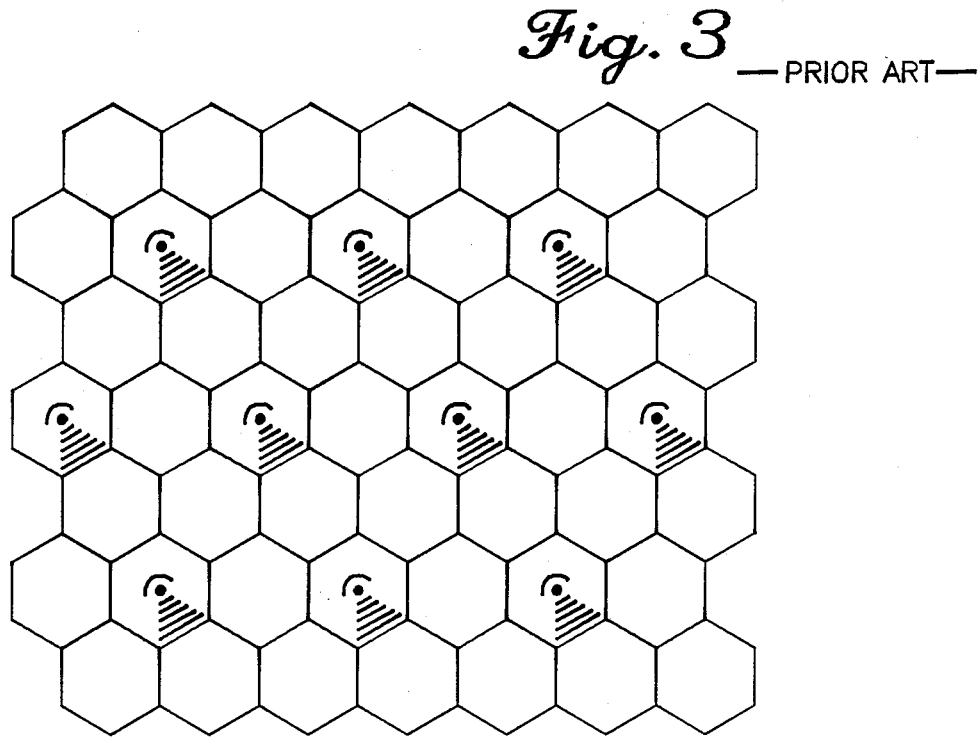

— PRIOR ART —

INTERFACE METHOD AND APPARATUS FOR A CELLULAR SYSTEM SITE CONTROLLER

This is a division, of application Ser. No. 830,390, filed Jan. 18, 1986 now U.S. Pat. No. 4,730,187.

BACKGROUND OF THE INVENTION

"Reference is made to instant assignee's U.S. Pat. Nos. 4,704,734 and 4,694,484 and U.S. patent application No. 073,916, "Scanning Receiver Allocation Method and Apparatus for Cellular Radiotelephone Systems" filed on behalf of Barry J. Menich et al on July 13, 1987, which contain related subject matter and are incorporated herein by reference," with—Reference is made to instant assignee's U.S. Pat. Nos. 4,704,734; 4,694,484; and 4,726,050, which contain related subject matter and are incorporated herein by reference.

The present invention generally relates to the fixed equipment of radiotelephone communication systems and more specifically relates to a method and apparatus for interfacing between the cell site control device, the system controller, and the radio transmitting and receiving equipment of a cellular radiotelephone system.

Mobile radiotelephone service has been in use for some time and traditionally has been characterized by a central site transmitting with high power to a limited number of mobile or portable units in a large geographic area. Mobile or portable transmissions, due to their lower transmission power, were generally received in previous systems by a network of receivers remotely located from the central site and the received transmission was subsequently returned to the central site for processing. In previous systems only a limited number of radio channels were available, thus limiting the number of radiotelephone conversations in an entire city to the limited number of channels available.

Modern cellular radiotelephone systems have a comparatively large number of radio channels available which, further, can be effectively multiplied by reuse of the channels in a metropolitan area by dividing the radio coverage area into smaller coverage areas (cells) using low power transmitters and coverage restricted receivers. Such cellular systems are further described in U.S. Pat. Nos. 3,906,166-Cooper et al.; 4,485,486-Webb et al.; and 4,549,311-McLaughlin, each assigned to the assignee of the present invention. The limited coverage area enables the channel frequencies used in one cell to be reused in another cell geographically separated according to a predetermined plan, such as a seven cell repeating omnidirectionally illuminated cell pattern shown in FIG. 1. In this pattern, radio frequency energy is transmitted from and received by a plurality of centrally located fixed stations and reuse of frequencies is accomplished in a pattern of cells such as that shown shaded in FIG. 1.

An alternative cellular pattern, FIG. 2, depicts a corner illuminated cell system in which 120° antennas are employed to illuminate the interior of a cell from three of the vertices of a hexagonal cell. (Although cell systems are conventionally shown as regular hexagonal patterns, such regularity is rarely achieved in practice).

Another pattern, FIG. 3, depicts a center illuminated cell system in which the cells are further subdivided into sectors. The sectors are illuminated by 60° antennas as illustrated in FIG. 3. A center illuminated sector cell system is further described in U.S. Pat. No. 4,128,740-Graziano and assigned to the assignee of the present invention. Thus, a large number of channels can be made available in a metropolitan area and the service provided thereby can appear to be identical to a standard wire line telephone.

A cell system typically utilizes one duplex frequency pair channel in each cell (a signalling channel) to receive requests for service from mobiles and portables, to call selected mobiles or portables, and to instruct the mobiles or portables to tune to another channel where a conversation may take place. This signalling channel is continuously assigned the task of receiving and transmitting data to control the actions of the mobile and portable radios. If the cell is sectorized as shown in FIG. 3, specialized receivers have been developed to enable the inputs from six 60° antennas to be combined for instantaneous reception over the sectorized cell coverage area. One such specialized receiver is described in U.S. Pat. No. 4,369,520-Cerny, Jr., et al., assigned to the assignee of the present invention.

Since the cells may be of relatively small size, the likelihood of a mobile or portable travelling between sectors or out of one cell and into another cell is high. The process of switching the established call from one sector or from one cell to another is known as handoff. Handoff previously has required specialized receiving equipment such as a "scanning" receiver which can be instructed to tune to any of the channels in use in any of the sectors of the cell to measure the signal strength of each active mobile or portable. If the measured signal strength is below a predetermined level, cellular control equipment determines the availability of other channels in other sectors of the same cell or in neighboring cells and composes an instruction to the mobile or portable commanding it to tune to the new channel.

The controlling function of each cell site must be able to accomplish the interface between fixed radio receiving and transmitting equipment and the central controller of the cellular system with efficiency and reliability. Present equipment performs the interface function with a complexity and expense that may be unnecessary in cells having a relatively small number of voice channels in operation.

SUMMARY OF THE INVENTION

Therefore it is an object of the present invention to reduce the cost and complexity of the cell site controller while providing reliability via redundancy.

It is a further object of the present invention to enable a redundant interface to exist between the cell site controller and the radio transceivers by reducing the amount of hardware at each transceiver by increasing the amount of firmware and by reducing the amount of firmware overhead at the cell site controller by increasing the amount of hardware.

It is a further object of the present invention to enable each transceiver via an independent enable line to prevent multiple transceivers from receiving and transmitting control data simultaneously.

It is a further object of the present invention to employ the ability of transferring blocks of program information between the system central controller and the cell site controllers such that the memory blocks may be retransferred upon detection of a checksum mismatch.

Accordingly, these and other objects are achieved in the present invention which is the method of conveying control and program information between cellular radiotelephone controllers. If a program memory information error has occurred in the operating program of a second controller, memory information (starting at a first memory address and ending at a second memory address) is transmitted from a first controller to the second controller. A first checksum for memory information stored at the second controller starting at the first memory address and ending at the second memory address is calculated. A second checksum for memory information received from the first controller starting at the first memory address and ending at the second memory address is also calculated and the two are compared. If a substantial match is found, memory information starting at a third memory address and ending at a fourth memory address from the first controller to the second controller. Otherwise, memory information starting at the first memory address and ending at the second memory address from the first controller to the second controller is retransmitted.

BRIEF DESCRIPTION OF THE DRAWINGS

FIG. 2 is a representation of the geographic area covered by a conventional corner illuminated cell system.

FIG. 3 is a representation of the geographic area covered by a conventional center illuminated sector cell system.

DETAILED DESCRIPTION OF THE PREFERRED EMBODIMENT

Figure 1:
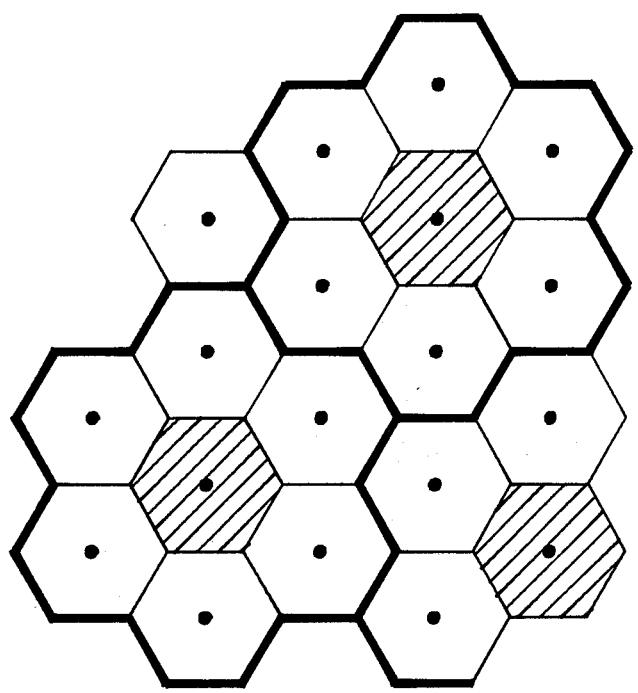
FIG. 1 is a representation of the geographic area covered by a conventional omnidirectionally illuminated cell system.
Figure 4:
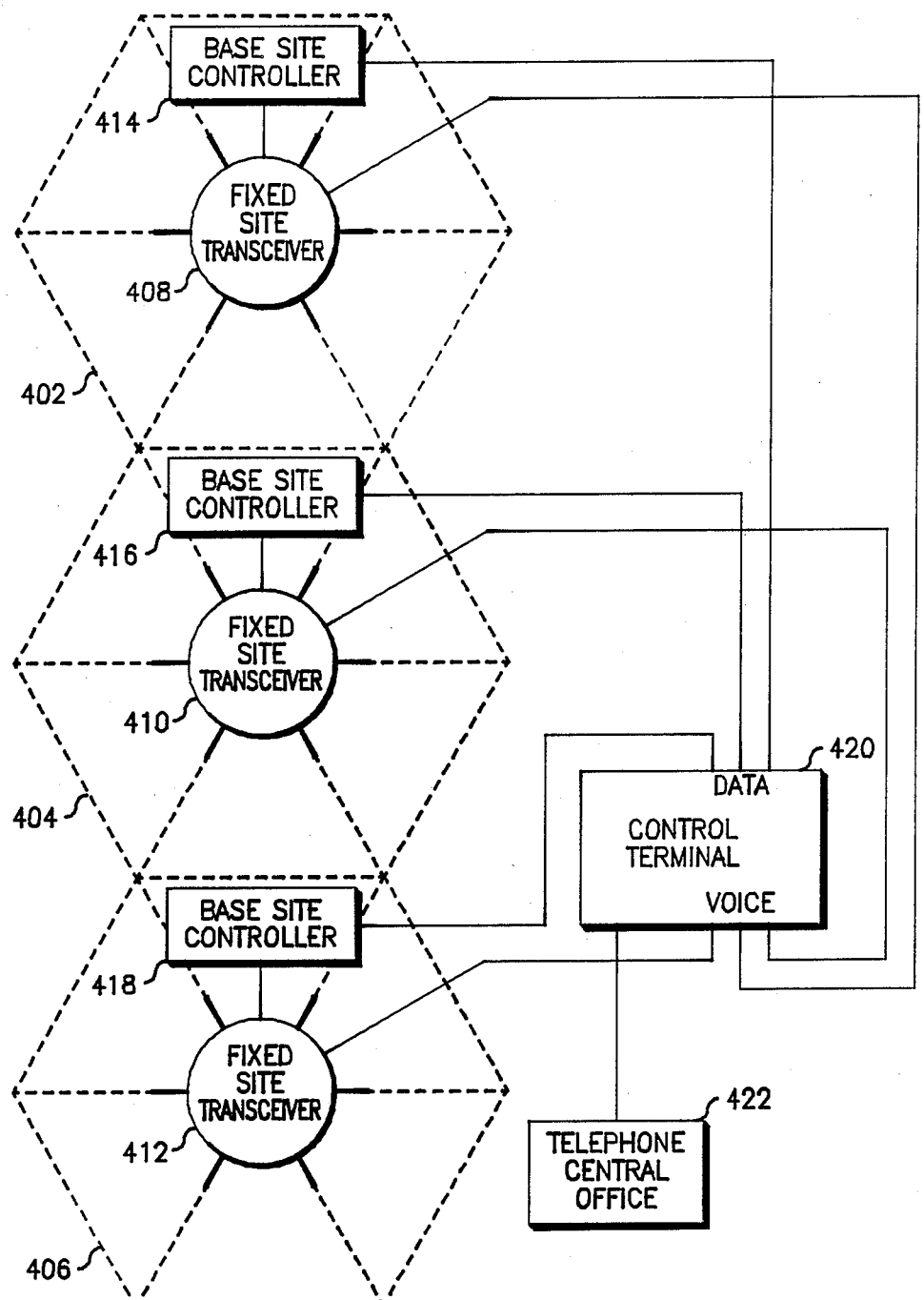
FIG. 4 is a basic block diagram of the relationships of the equipment which would be employed in a conventional center illuminated sector cell system.

Referring now to FIG. 4, there is illustrated a cellular radiotelephone communications system of the type which may particularly benefit from the invention herein described. The illustration of FIG. 4 shows three center illuminated sector cells of the type previously described in conjunction with FIG. 3 but with more detail regarding the type of equipment to be found in a sector cell system. Although the present invention will be described with particularity for the center illuminated sector cell system, it is obvious that a person skilled in the art may be able to apply the essence of the present invention to other types of cellular configurations such as those shown in FIG. 2 and FIG. 1.

As illustrated in FIG. 4, the geographical area is subdivided into cells 402, 404, and 406 which are illuminated with radio frequency energy from fixed site transceivers 408, 410, and 412, respectively. The fixed site transceivers are conventionally controlled by base site controllers 414, 416, and 418 as illustrated. These base site controllers are each coupled by data and voice links to a radiotelephone control terminal 420 which may be similar to the terminals described in U.S. Pat. Nos. 3,663,762; 3,764,915; 3,819,872; 3,906,166; and 4,268,722. These data and voice links may be provided by dedicated wire lines, pulse code modulated carrier lines, microwave radio channels, or other suitable communication links. Control terminal 420 is, in turn, coupled to the switched telephone network via a conventional telephone central office 422 for completing telephone calls between mobile and portable radiotelephones and landline telephones.

Figure 5:
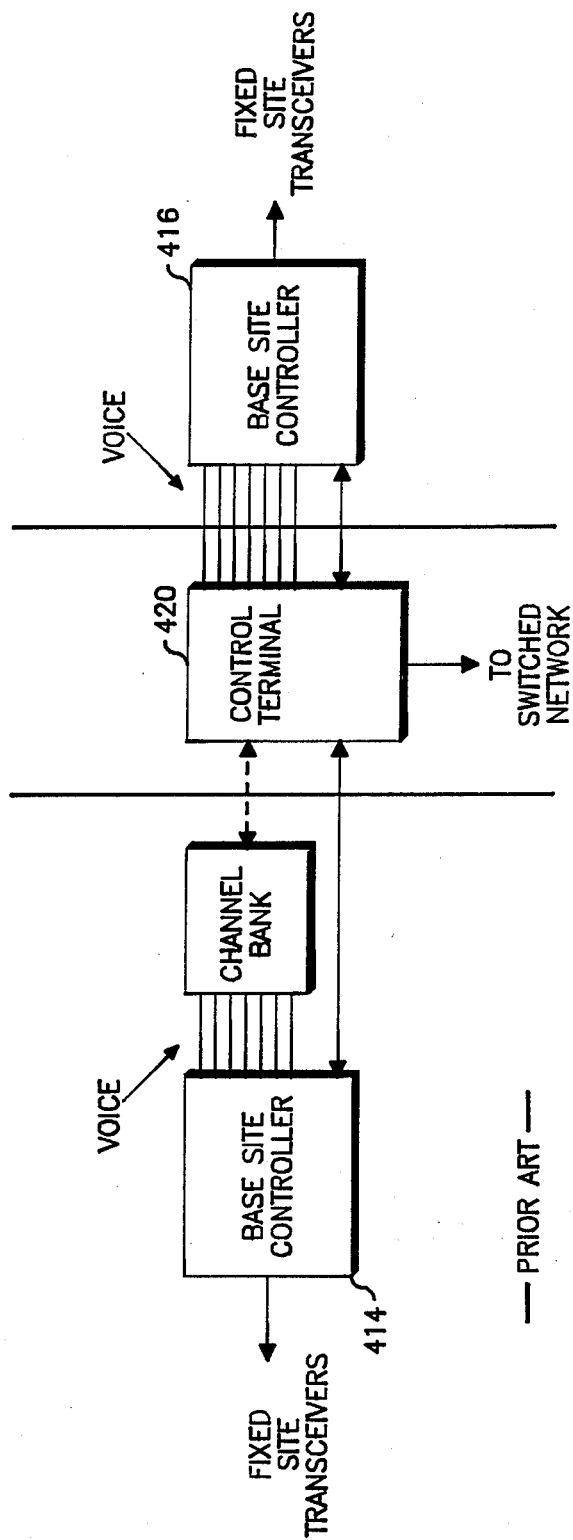
FIG. 5 is a block diagram of the interconnection between a control terminal and the base site controllers of a conventional cell system.

The interconnection between control terminal 420 and the base site controllers (BSCs) is further shown in FIG. 5. The per-channel interconnection may be on a line per channel basis such as shown between control terminal 420 and BSC 416 or the interconnection may be on a PCM group basis such as shown between control terminal 420 and BSC 414. Either type of interconnection is well known in the art. A separate data line (which may be a standard telephone line or other communications link capable of carrying 4800 baud data) is extended between the control terminal 420 and each BSC under its control.

Figure 6:
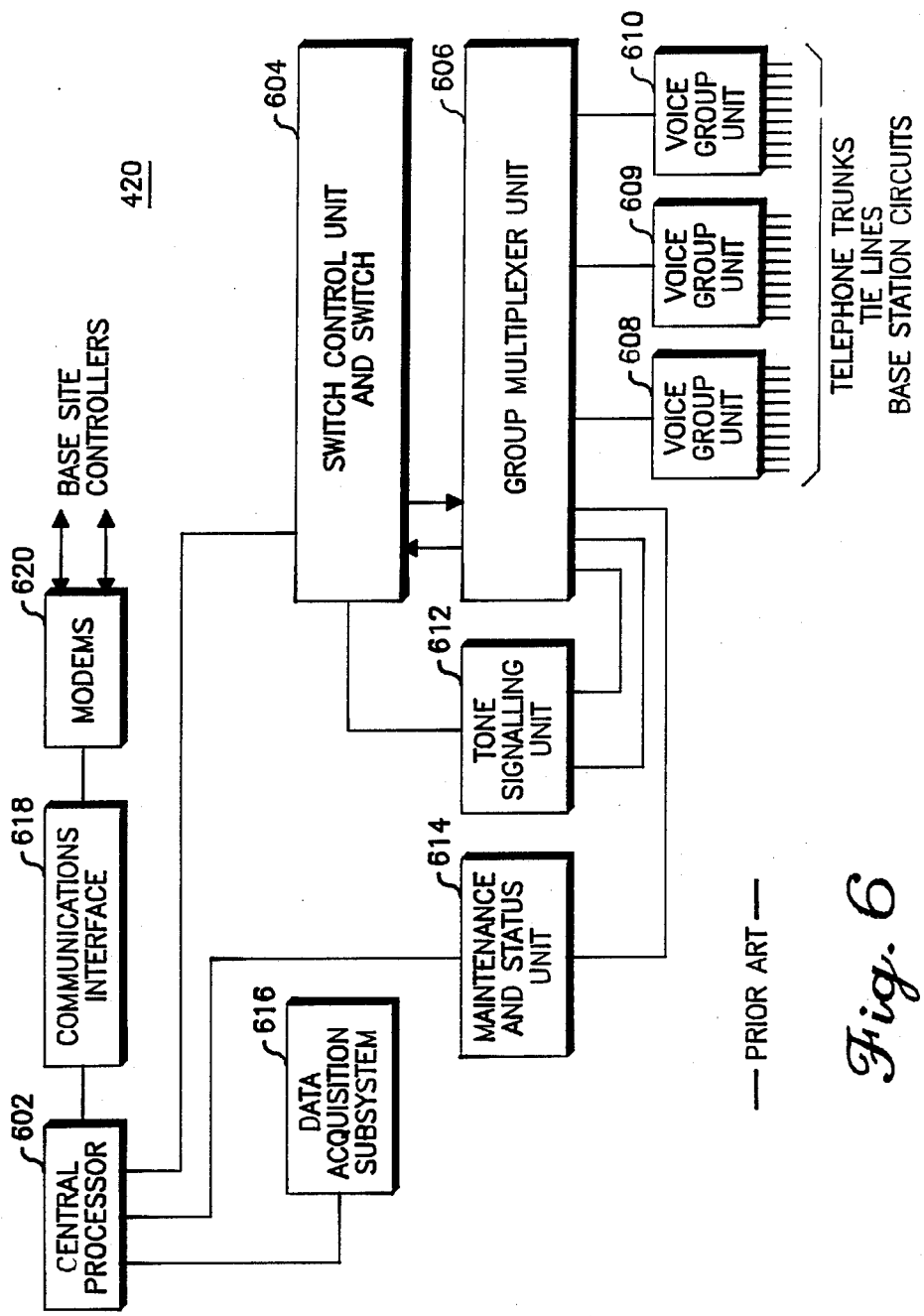
FIG. 6 is a block diagram of a conventional control terminal for a cell system.

A functional block diagram of a typical control terminal 420 is shown in FIG. 6. This control terminal may be an EMX100 available from Motorola, Inc. or suitable equivalent. Basically, the control terminal consists of a central processor 602, a switch control unit and switch 604, group multiplexer unit 606, voice group units 608 through 610, tone signalling unit 612, maintenance and status unit 614, data acquisition subsystem 616, communications interface 618, and BSC modems 620. Communications with the BSC may be accomplished via conventional 4800 bit per second modems.

Each of the fixed site transceivers 408, 410, and 412 includes a plurality of transmitters and receivers for operating on at least one duplex signalling channel and a plurality of duplex voice channels. One conventional system employs transmitters and receivers of the type described in Motorola Instruction Manual No. 68P81060E30, published by Motorola Service Publications, Schaumburg, Ill., in 1982. Employing this equipment and spacing the channels in use at least 630 KHz from each other, enables the individual transmitters to be combined on a single antenna (which may be a 60° directional antenna for sectorized cells or an omnidirectional antenna for non sectorized cells).

Figure 7:
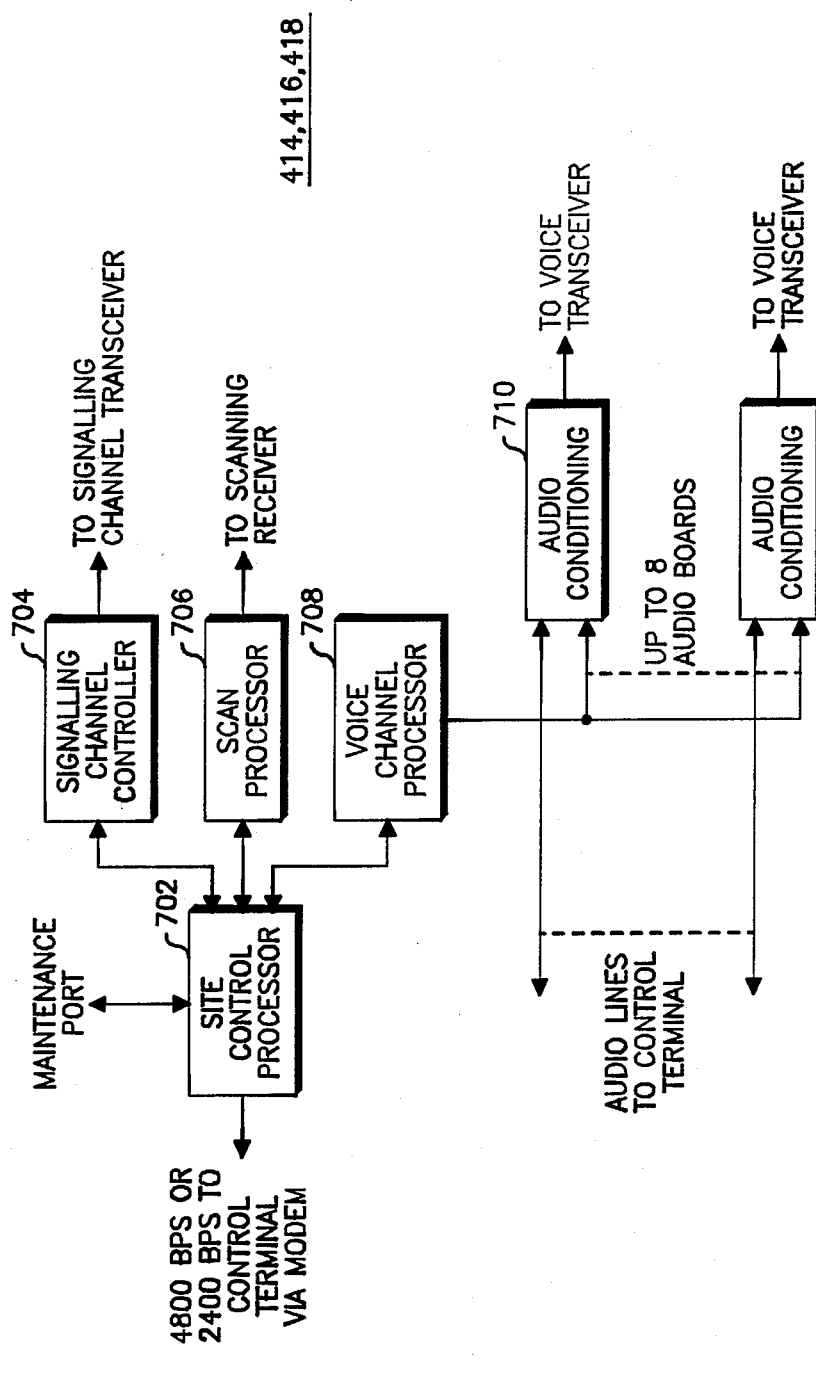
FIG. 7 is a block diagram of a conventional base site controller which may be employed in a cell system.

A conventional base site controller (414, 416, or 418) is shown in more detail in the block diagram of FIG. 7. The base site controller (BSC) provides two-way subscriber remote unit (mobile and portable) signalling, voice communications, and complete control and performance monitoring of the fixed site equipment. The BSC consists of a site control processor module 702 which controls all aspects of the base site operation. The site control processor 702 contains memory storage buffers for communication with the peripheral processors 704, 706 and 708. The site control processor 702 also contains serial interface ports for communicating with other site control processors and for communicating with the control terminal 420 and an RS-232 port for connection to a maintenance terminal. A signalling channel controller peripheral 704 sends paging and overhead messages to subscriber units via the signalling channel by command of the site control processor 702. The signalling channel controller 704 also decodes and corrects data received from subscriber units. In systems using sector receive antennas, it uses information from a signalling channel receiver to make an initial estimate of the subscriber unit's location.

The scan processor peripheral 706 measures every active subscriber unit signal strength on each receive antenna. A method and apparatus for measuring signal strength on receive antennas is further described in U.S. Pat. No. 4,485,486-Webb et al., assigned to the assignee of the present invention. It also measures the supervisory audio tone frequency of subscriber units to verify that it is making measurements on the correct subscriber unit. The scan processor 706 is capable of directing a scanning receiver to any subscriber frequency and measuring any of the three supervisory audio tone frequencies. The voice channel processor peripheral 708 controls up to eight voice channel IFs and the subscriber units using them. The voice channel processor 708 interfaces to each voice channel receiver through an audio conditioning board 710. The voice channel processor 708 sends messages to subscriber units by command of the site control processor 702 and further decodes and corrects data messages from subscriber units over the appropriate voice channel. The voice control processor 708 controls voice transmitters and voice channel receive antenna selection. The audio conditioning boards 710 are employed one for each voice channel in use at a fixed site. The audio conditioning boards 710 conditions and controls the audio for connection to both the receiver and transmitter radio equipment and the telephone lines to the control terminal 420.

Figure 8:
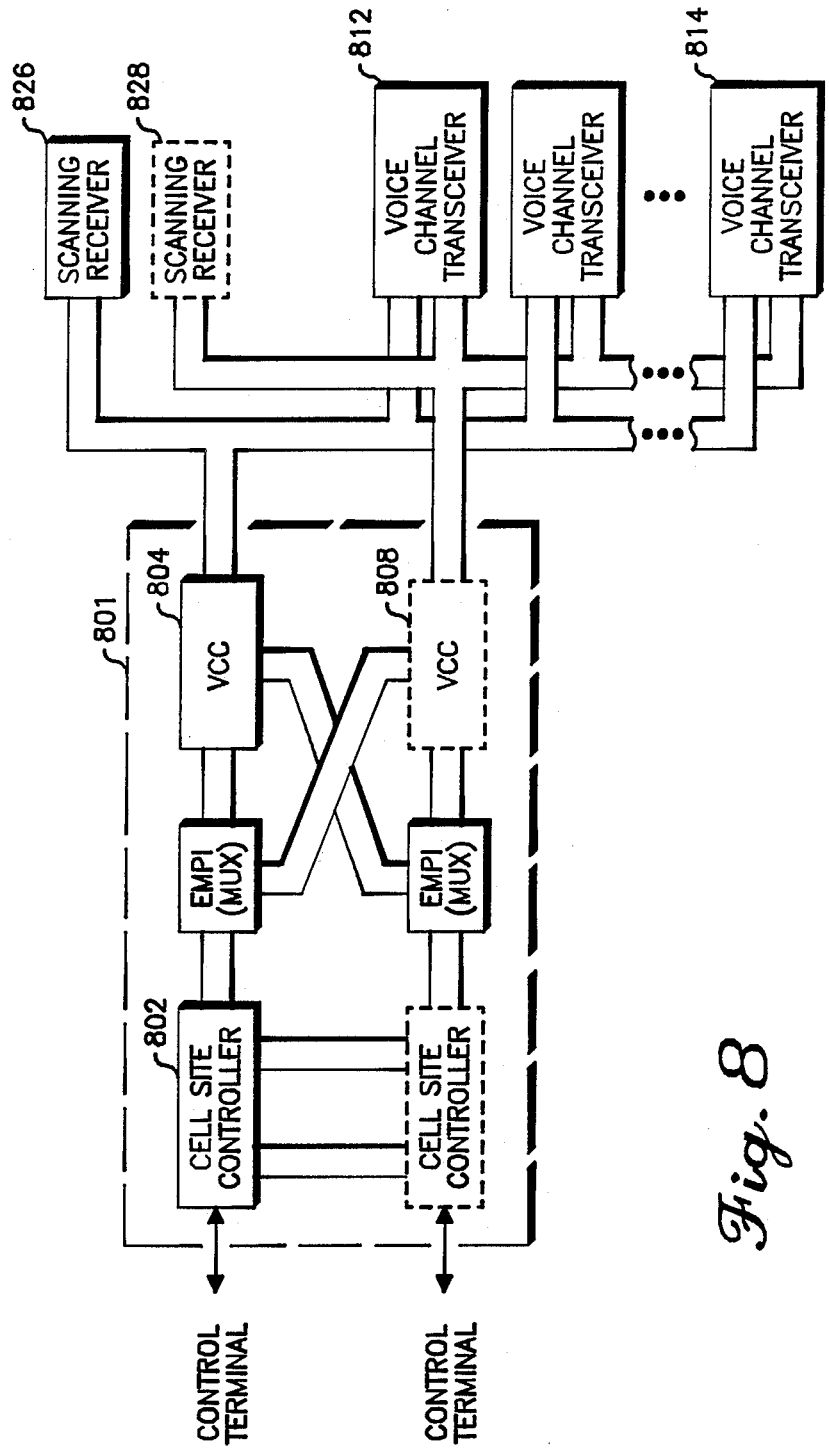
FIG. 8 is a block diagram of the base site controller of the present invention illustrating redundancy.

FIG. 8 illustrates the basic block diagram of the base site controller (BSC) 801 of the present invention and its interconnection to the transceivers of the fixed site radio equipment. The cell site controller (CSC) 802 is the highest level function and coordinates all of the activities at the cell site including fault management and channel assignment as well as providing the interface between the cell site and the telephone central office 422 (mediated by the control terminal 420).

Figure 9:
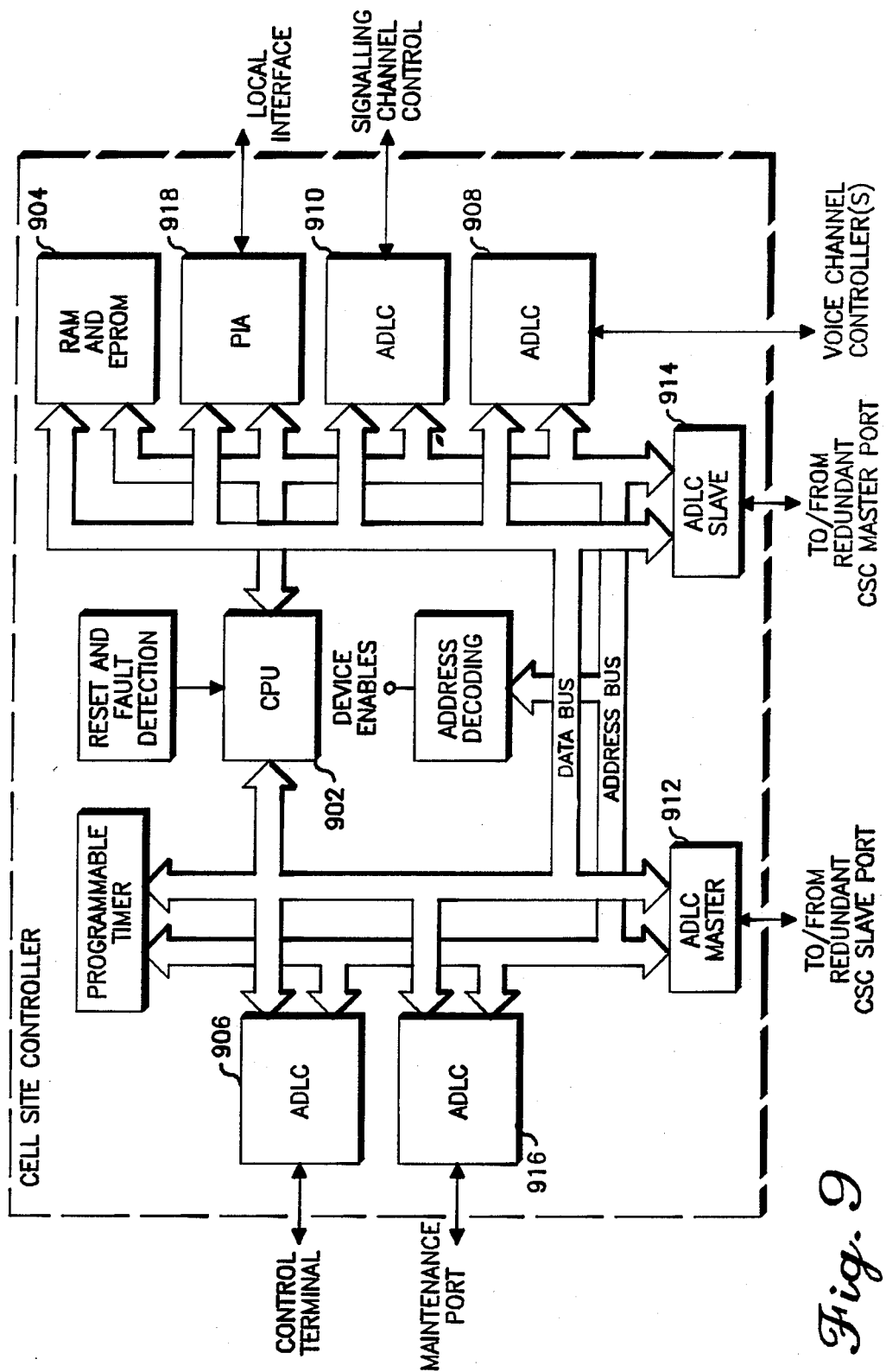
FIG. 9 is a detailed block diagram of a cell site controller (CSC) such as that which may be employed in the base site controller of FIG. 8.

A more detailed block diagram of the cell site controller (CSC) is shown in FIG. 9. A microprocessor such as an MC6809 available from Motorola, Inc., is employed as a central processing unit (CPU) 902 which coordinates all of the activities at the cell site in accordance with an operating program stored in RAM and EPROM 904. Six data ports are used to exchange control and status messages with the control terminal 420 (via ADLC 906), one or more voice channel controllers (VCCs) (via ADLC 908), signalling channel receiver control (via ADLC 910), redundant (slave) CSC and/or redundant (master) CSC (via ADLC 912 and 914 respectively), and a maintenance port (via ACIA 916). All of the aforementioned serial ports in the preferred embodiment, except for the maintenance port, are bit-oriented synchronous serial data links using a version of the Advanced Data Communications Control Procedures (ADCCP) as the communications protocol. The maintenance port, used for maintenance and software loading, supports a standard asynchronous serial protocol. Additionally, a peripheral interface adapter (PIA 918) supports auxiliary input/output which may be used as a local customer interface.

In this way, when a transceiver switches from control of a master VCC to a backup VCC (a "reconfiguration" which converts a master VCC into a backup VCC and vice versa due to a fault condition) the backup VCC does not have to rely upon status information regarding the transceiver call status and alarms from the master VCC. Information reported from the master VCC could be erroneous if the master VCC has failed. The reconfigured backup (now master) VCC receives status information from the voice channel transceiver itself by querying the voice channel transceiver with a message which will be described later.

A voice channel controller (VCC) 804 may control up to 30 voice transceivers and one scanning receiver in the preferred embodiment. A redundant VCC 808 may be employed to provide system redundancy down to the voice channel transceiver. This is possible because each transceiver of the preferred embodiment (voice channel receivers 812 or 814, for example) may have two communications ports with which to communicate with two VCCs. The communication ports on the transceivers are embodied within the transceiver microcomputer itself. A signal called "XCVREN" (transceiver enable) is used by the VCC to select the port on the transceiver that will be used for communications. One VCC will control one port and a redundant "partner" VCC will control the other port. The transceiver communicates with that VCC which is currently asserting the XCVREN signal. Thus it is possible for the second VCC to continue controlling a voice transceiver should the first VCC fail. It is even possible to reconstruct call activity by polling the transceivers (query) as the call processing and maintenance state of the voice transceiver is continuously being updated.

If the maintenance state of the channel is "in service", the call processing state can be taken from the transceiver and reconstruct the call. The call processing and maintenance states of a particular channel are stored within the transceiver by sending these states periodically in certain messages that are used to control the transceiver by the controlling VCC. When another VCC (the partner) takes control of the channel, it queries the transceiver as to its call and maintenance states. The maintenance state is used to update a list and the call state is used to reconstruct the SAT detection algorithm in the VCC. From the call state it can be determined whether to be looking for positive or negative SAT detection on the channel. This corresponds to the channel being in a conversation state, a connect state, or a disconnect state.

Figure 10:
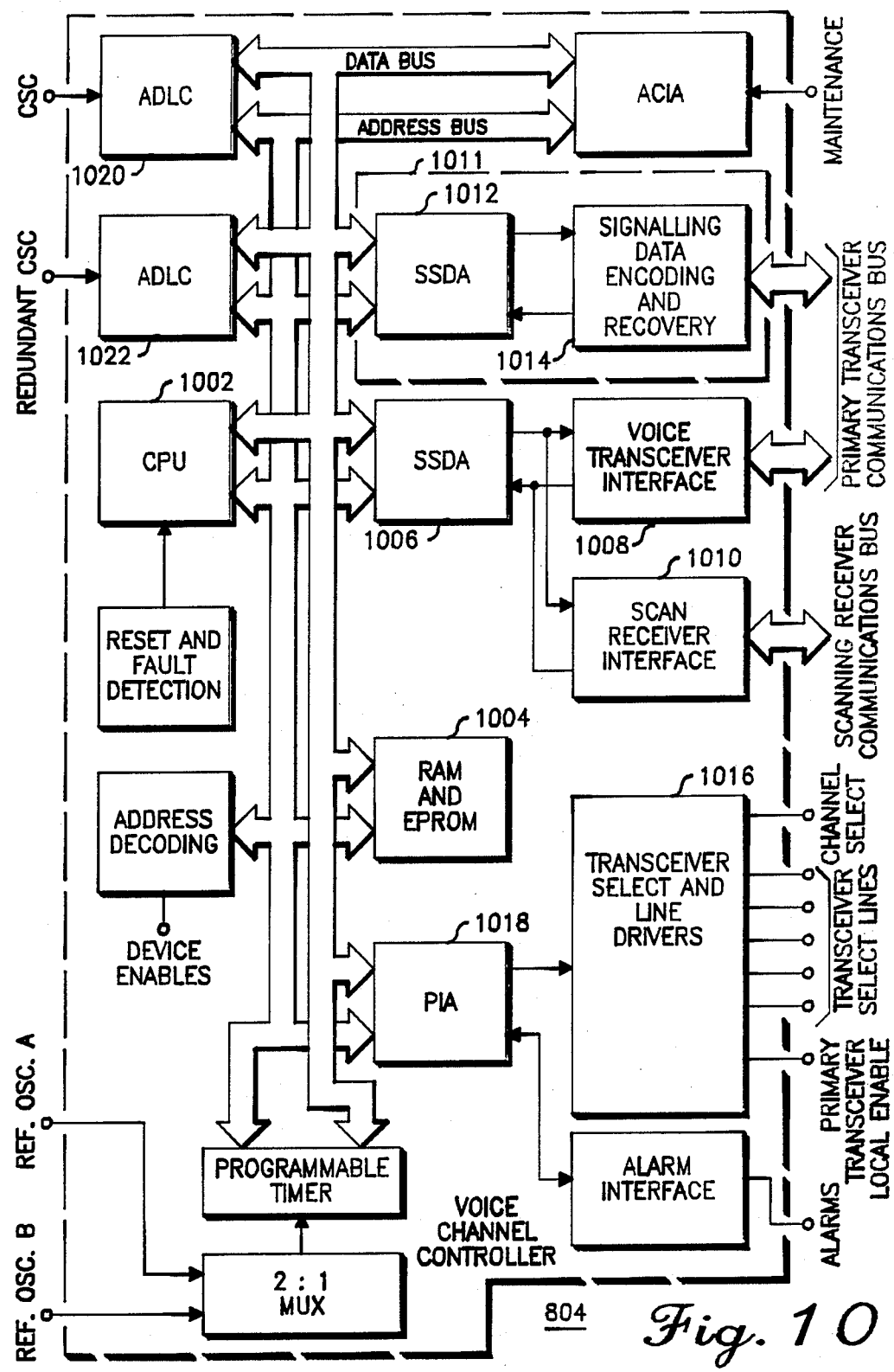
FIG. 10 is a detailed block diagram of a voice channel controller (VCC) such as that which may be employed in the base site controller of FIG. 8.

A detailed block diagram of a voice channel controller (such as VCC 804) which may be employed in the present invention is shown in FIG. 10. The central processing unit (CPU 1002) may be a microprocessor such as an MC6809 available from Motorola, Inc. This CPU 1002 is used to control the cell site voice channel and scanning receiver(s) in accordance with programmed steps stored in RAM and EPROM 1004. In a nonredundant configuration of the present invention, VCC 804 may control up to 30 channels of radio equipment and one scanning receiver employing SSDA 1006 (which may be an MC6852 peripheral or equivalent), voice channel transceiver interface 1008 (which may be conventional line drivers/receivers and data decoder), and scanning receiver interface 1010 which may also be conventional line drivers/receivers and decoders). Signalling data encoding and decoding is controlled via data circuits 1011 which consist of SSDA 1012 and signalling encoding and recovery interface 1014. Transceivers are selected by select logic and line driver circuit 1016 which is controlled by CPU 1002 via peripheral interface adaptors (PIA 1018 which may be an MC6821 or equivalent). In the redundant configuration requiring two VCCs, each transceiver (being dual-ported) can communicate with both VCCs. Under normal operating conditions, each VCC actively controls half of the channels while exchanging control and status messages with the other half. Interface with the master CSC (if present) via ADLC 1022.

Figure 11:
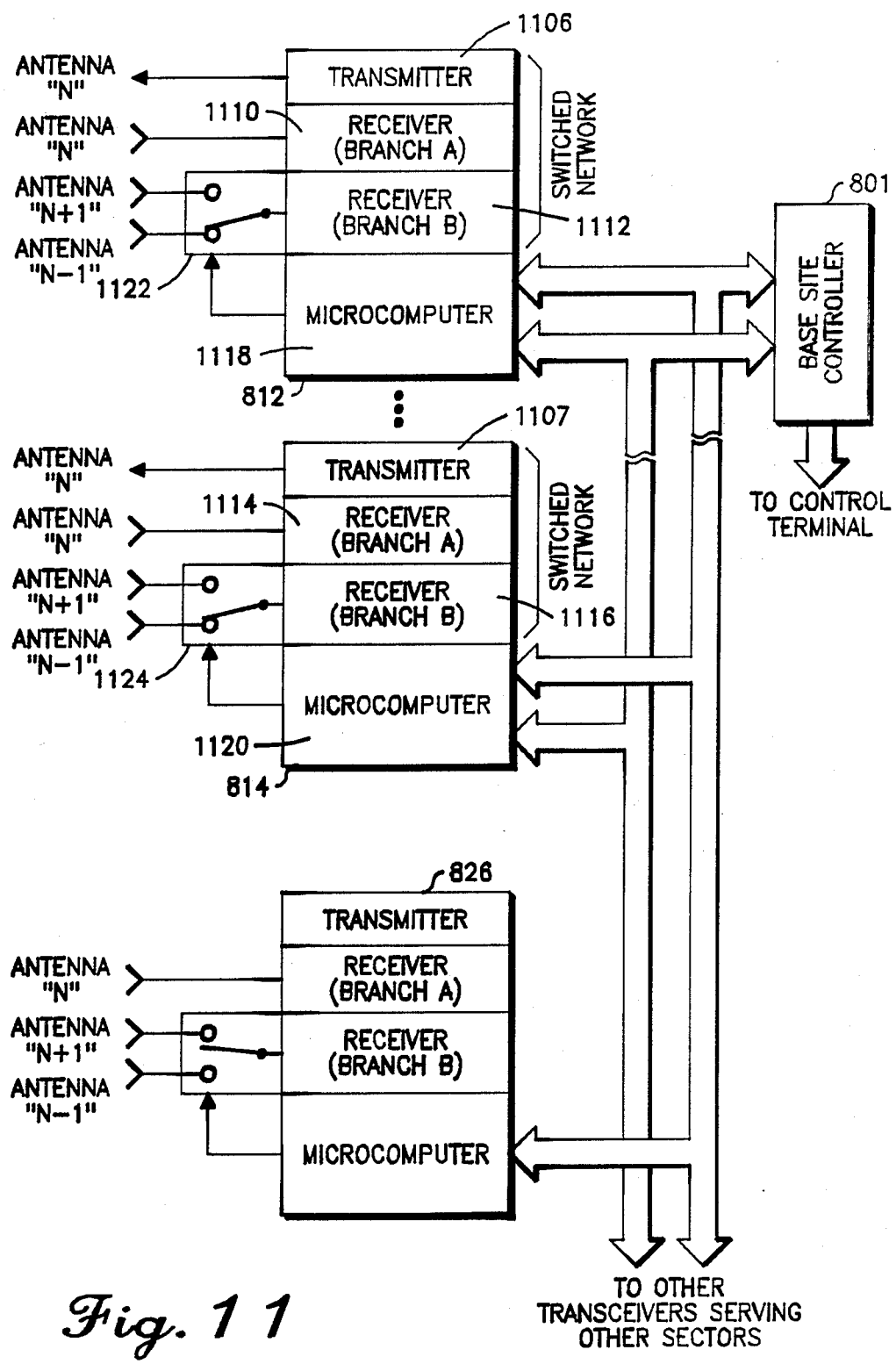
FIG. 11 is a block diagram of transceiver and base site controller interconnection in a cell system which may benefit from the present invention.

The interconnection of the fixed site transceivers to the antenna system and to the base site controller is illustrated in FIG. 11. Although the transceivers are shown connected to a sector antenna system in which the primary sector "N" is used for both transmitting and receiving, and the left adjacent sector ("N−1") and the right adjacent sector ("N+1") are employed for diversity reception, other antenna connections (such as omnidirectional) may be employed without departing from the scope of the present invention. In this configuration a transceiver (such as transceiver 802 or transceiver 804) consists of a transmitter 1106 and 1107 respectively, diversity receivers 1110 and 1112 (for transceiver 802) and diversity receivers 1114 and 1116 for transceiver 804. Each transceiver also comprises a microcomputer (1118 and 1120, respectively) and a sector switch (1122 and 1124, respectively). Additionally, an identical transceiver may be used as a scan receiver by employing the diversity receivers and the microcomputer as shown for transceiver 826. (The transmitter for scanning transceiver 826 is not used).

Concentrating on the interconnections of transceiver 802, it can be seen that transmitter 1106 and receiver (branch A) 1110 are coupled to the same primary antenna. Receiver (branch B) 1112 is coupled to left and right adjacent sectors via sector switch 1122. The output bus from the BSC 801 is connected to each of the microcomputers of the transceivers at a cell site. In the transceivers of the present invention, the transmitter 1106 input and receivers 1110 and 1112 output are connected to the switched network via the control terminal 420. Control of the interconnection to the control terminal 420 achieved by microcomputer 1118 via control signals from the BSC 801 and the control terminal.

Figure 12:
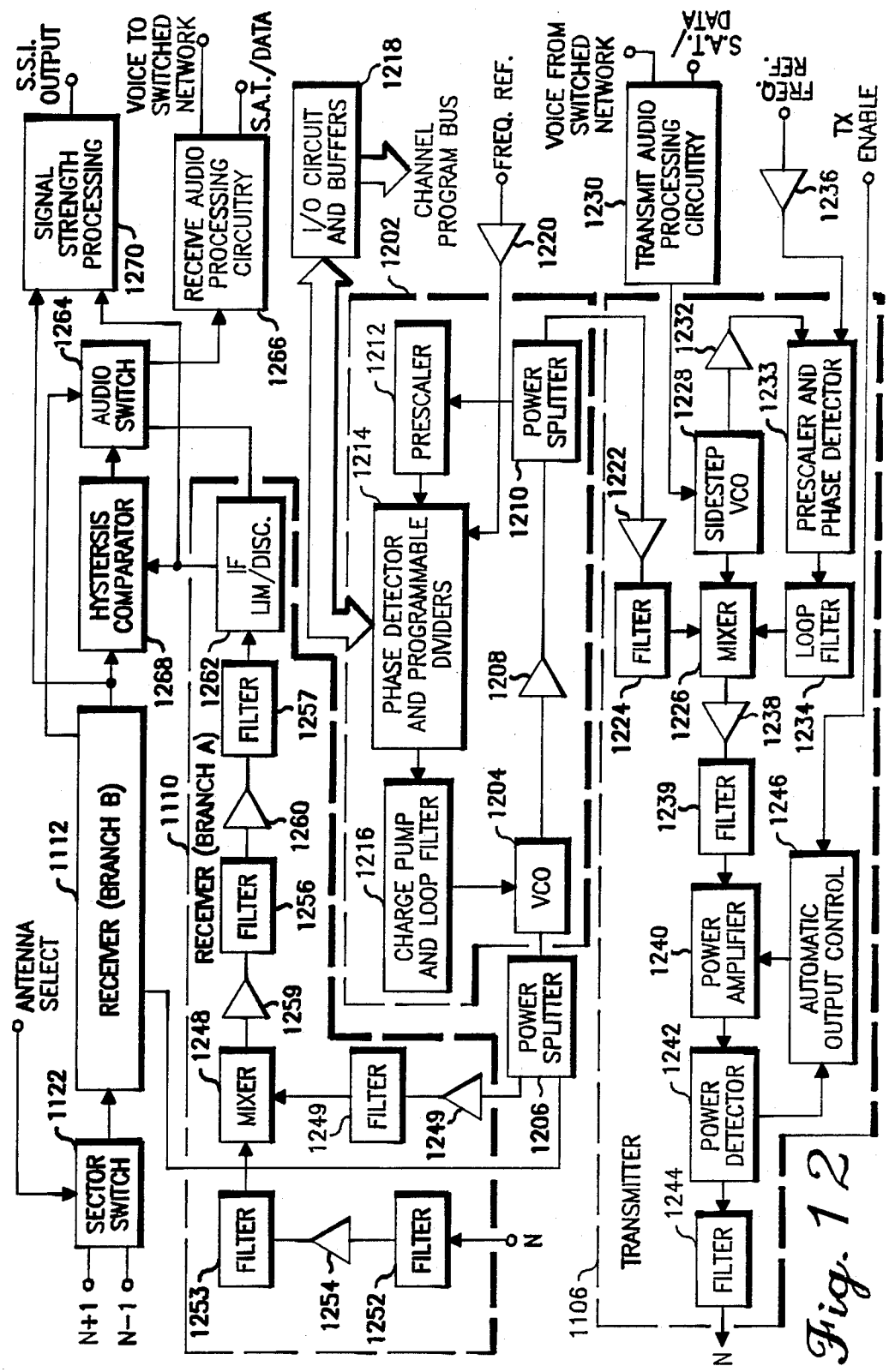
FIG. 12 is a detailed block diagram of the transceiver which may be employed in the system of the present invention.

A more detailed block diagram of the transceivers of the preferred embodiment is shown in FIG. 12. Transmitter 1106 and receivers 1110 and 1112 from transceiver 802 are shown in detail. Each of the other transceivers including the scanning transceiver 826 may have an identical design. In a preferred implementation of the present invention, a synthesizer 1202 having a conventional VCO 1204 provides the local oscillator signal for both receivers 1110 and 1112 via a power splitter 1206. The VCO 1204 also supplies a radio frequency signal to the transmitter 1106 via a buffer amplifier 1208 and power splitter 1210. A second output from power splitter 1210 is used as part of the conventional feedback of a frequency synthesizer and routed through pre-scaler 1212 to the phase detector and programmable dividers 1214 which, in turn, provides a correction signal to the charge pump and loop filter 1216 to place and hold the VCO 1214 at the proper frequency. Frequency selection is conventionally made by selecting the proper division ratio of the programmable dividers and buffers 1218. The channel program bus is coupled to the transceiver microcomputer (such as microcomputer 1118) which selects the proper digital signal for the bus to place the transceiver on a designated channel. The ultimate stability of the synthesizer 1202 is determined by the frequency reference generated by an input to the phase detector and programmable dividers 1214 via buffer 1220. This reference is generated by a reference oscillator located in a common front end cabinet.

The transmitter 1106 accepts the synthesizer 1202 frequency output signal at buffer amplifier 1222 and filters the radio frequency signal by filter 1224 before applying the radio frequency signal to mixer 1226. A second signal applied to mixer 1226 is generated by the sidestep VCO 1228 and conventionally angle modulated by voice signals from the switched network and data and supervisory audio tone (SAT) which are input to the sidestep VCO 1228 via transmit audio processing circuitry 1230 (which may be similar to model TRN9732A Audio/Control Board described in Motorola Instruction Manual No. 68P81071E17, published by Motorola Service Publications, Schaumburg, IL in 1985). The sidestep VCO 1228 is maintained at a frequency which is equal to or related to the spacing between the receiver and transmitter operating frequencies of the selected channel and the frequency chosen as the intermediate frequency of the receivers 1110 and 1112 by the conventional synthesizer control loop consisting of buffer amplifier 1232, prescaler and phase detector 1233, and loop filter 1234. Ultimate loop stability is controlled by the same frequency reference used for synthesizer 1202 via buffer amplifier 1236. (A similar method of sidestepping frequencies for duplex receivers and transmitters is further described in U.S. Pat. No. 3,825,830-O'Connor assigned to the assignee of the present invention). The output signal from mixer 1226, which in the present invention is equal to the output frequency of the amplifier 1238 and filter 1239 to power amplifier 1240 where the transmitter signal is boosted in power to a useable transmission level. The output of the power amplifier 1240 is coupled through a power detector 1242 and a filter 1244 before being coupled to a duplexer or to an external power amplifier which may further increase the transmitter signal power. The output from power detector 1242 is coupled to a conventional automatic output control circuit 1246 which fixes the level of the output of power amplifier 1240 at a constant level.

The receiver local oscillator signal is coupled from the power splitter 1206 to the mixer 1248 of receiver (branch A) 1110 via buffer amplifier 1249 and filter 1250. (Identical circuit configuration exists for receiver (branch B) 1112 and an identical description for receiver (branch B) 1112 is omitted here for brevity). A received signal from the primary antenna is input to the mixer 1248 via filters 1252 and 1253 and radio frequency preamp 1254. The intermediate frequency (IF) product of the two signals input to mixer 1248 is selected by filters 1256 and 1257 and amplified by IF amplifiers 1259 and 1260 before being applied to an IF limiter/discriminator circuit 1262. Two outputs are provided from the IF limiter/discriminator 1262, the first of which is the demodulated audio signal which is passed through audio switch 1264 and receive audio processing circuitry 1266 (which also may be similar to a model TRN9732A Audio/Control Board) where the voice signal is coupled to the switched network, and the data is coupled to the BSC, and the supervisory audio tone (SAT) is detected by comparison to a locally generated tone and the detection is supplied to a microprocessor of the transceiver microcomputer 1118. A second output from the IF limiter discriminator 1262 is a signal which corresponds to the signal strength of the received signal from the antenna and is known as the receive signal strength indicator (RSSI). The RSSI signal is coupled to a hysteresis comparator 1268 (an MC3302 or equivalent in the preferred embodiment) which compares the RSSI signal from receiver (branch A) 1110 and receiver (branch B) 1112. The result of the comparison causes the audio switch 1264 to pick the demodulated audio signal from either receiver 1110 or receiver 1112 depending upon which RSSI signal indicates a stronger received signal and allows that demodulated audio to be coupled to the received audio processing circuitry 1266. In one implementation of the preferred embodiment, further processing of the RSSI signal is accomplished in a signal strength processing circuit 1270 and output to the transceiver microcomputer 1118 for use by the BSC 801 and control terminal 420. Such a receiver having the signal strength processing circuit 1270 may be used as a scanning receiver 826.

Figure 13:
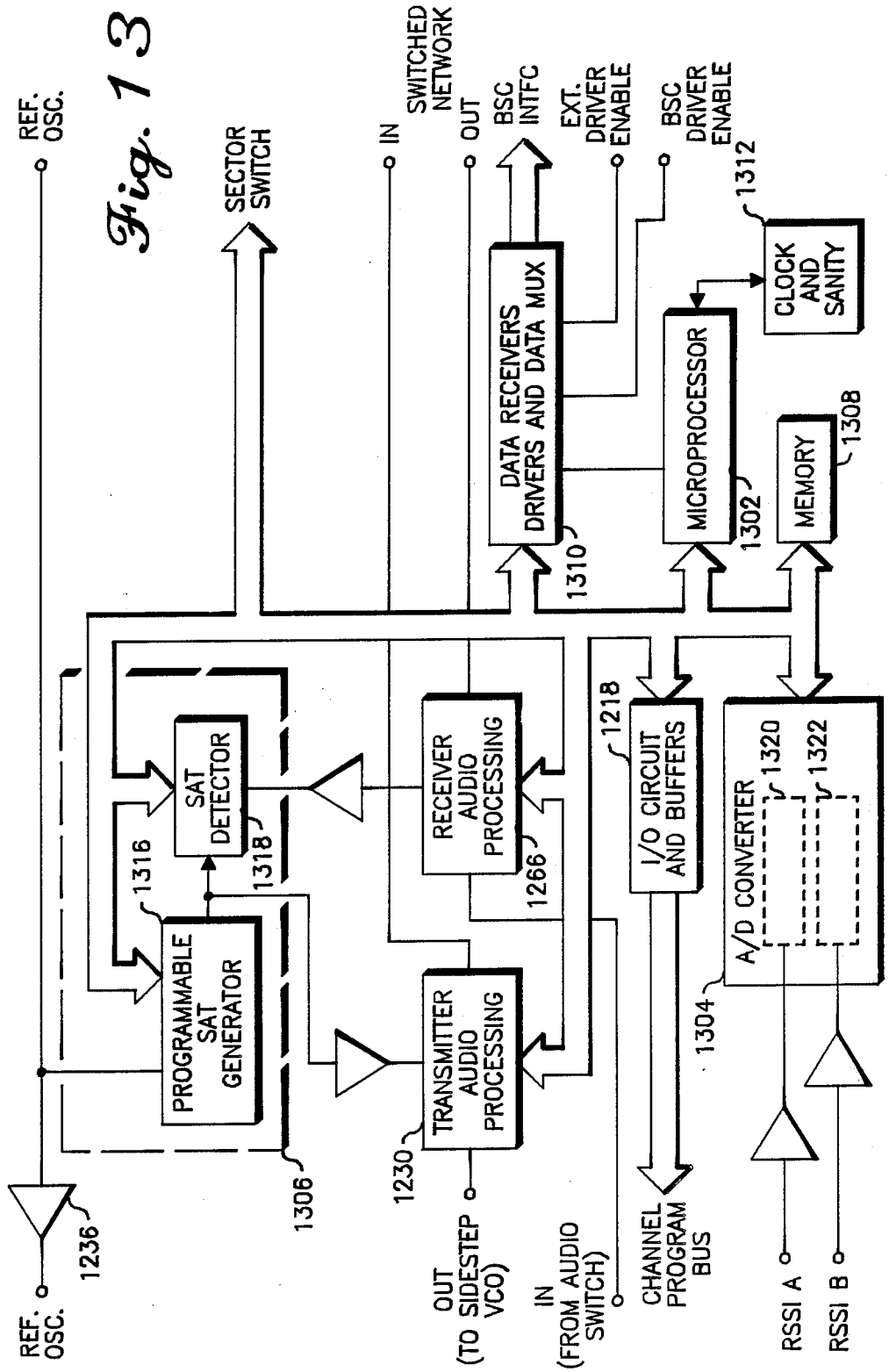
FIG. 13 is a block diagram of the microcomputer which may be employed in the transceiver of FIG. 12.

Referring to FIG. 13, it will be seen that the microcomputers 1118 and 1120 of the transceivers may consist of a microprocessor 1302 (which may be an MC1468705G2 microprocessor available from Motorola, Inc. or equivalent) which is used to control the other submodules of the transceiver. The microcomputer 1118 has as major peripherals an A/D converter 1304, a supervisory audio tone (SAT) generator 1306, conventional RAM and ROM memory 1308, conventional data receivers, drivers and data mux (for selecting sources and destinations of landradio data) 1310, and microprocessor clock and sanity timing device 1312. Control data, alarms, and other information may be coupled between the microprocessor 1302 and the base site controller (BSC) via the data receivers/drivers 1310 which may have additional enable ports for external control. The analog to digital (A/D) converter 1304 for the received signal strength may be realized by a multiplexing A/D converter such as an MC145041 available from Motorola, Inc. or equivalent. Conceptually, a dual channel A/D converter 1304 can be considered individual A/D channel 1320 for receiver (branch A) and A/D channel 1322 for receiver (branch B). The digitized received signal strength is made available to microprocessor 1302 as needed.

The supervisory audio tone (SAT) detector 1306 is realized in the preferred embodiment by generating a selected SAT frequency in a programmable SAT generator 1316 (which may conventionally be realized using a phase locked loop such as an MC14046 available from Motorola, Inc. and standard programmable BCD/binary counters such as MC14569 available from Motorola, Inc.). The SAT output may then be coupled to a SAT detector circuit 1318 which may be a conventional frequency comparison network. The detection may then be coupled to the microprocessor 1302.

Because the transceiver of the preferred embodiment is equipped with a programmable frequency synthesizer 1202 for both receiver and transmitter (programmed by microprocessor 1302 via I/O circuit and buffers 1218), and A/D converter 1304, and a SAT generator 1306, the transceiver may be used interchangeably as a scan receiver, as a voice channel receiver, or a signalling channel receiver. This fact allows the BSC 801 to be relieved of the task of making and controlling the process of signal strength measurement and SAT detection thereby making possible the use of available voice channel transceivers as scanning receivers when a handoff measurement request is received from the control terminal 420. The transceiver takes cell site characteristics that are downloaded from the voice channel controller of BSC 801 via the transceiver interface communications link. The downloaded information is the cell type in which the transceiver is being operated (Omni, Sector) and what kind of function the transceiver is to perform in the system: voice channel transceiver, scanning receiver, or signalling transceiver. Also, the transceiver used for scanning is capable of queueing several handoff measurement requests, executing them, and queueing the results.

Handoff measurement requests that come to a transceiver via the VCC are queued automatically and are run as soon as possible. The only reason that a handoff measurement request would not run immediately is that it would have to wait for a current request to finish execution. Included within the handoff measurement request are the channel frequency synthesizer 1202 programming and the SAT generator 1316 programming.

When a handoff measurement request comes to a selected transceiver, a flag is set that alerts the SSI measurement software to the fact that there is a measurement request that is waiting execution in the queue. When the measurement request software task runs, it pulls the request out of the queue, programs the SAT generator 1316, programs the frequency synthesizer 1202, and then begins taking measurements.

Results of the handoff measurement requests are queued in the RAM memory 1308 of the transceiver microcomputer and await an opportunity to be sent uplink to the VCC. That opportunity comes when the VCC polls the transceiver for its status. Since handoff measurement responses have priority over all other outbound messages from the transceiver, the response will go uplink as soon as possible.

Figure 14:
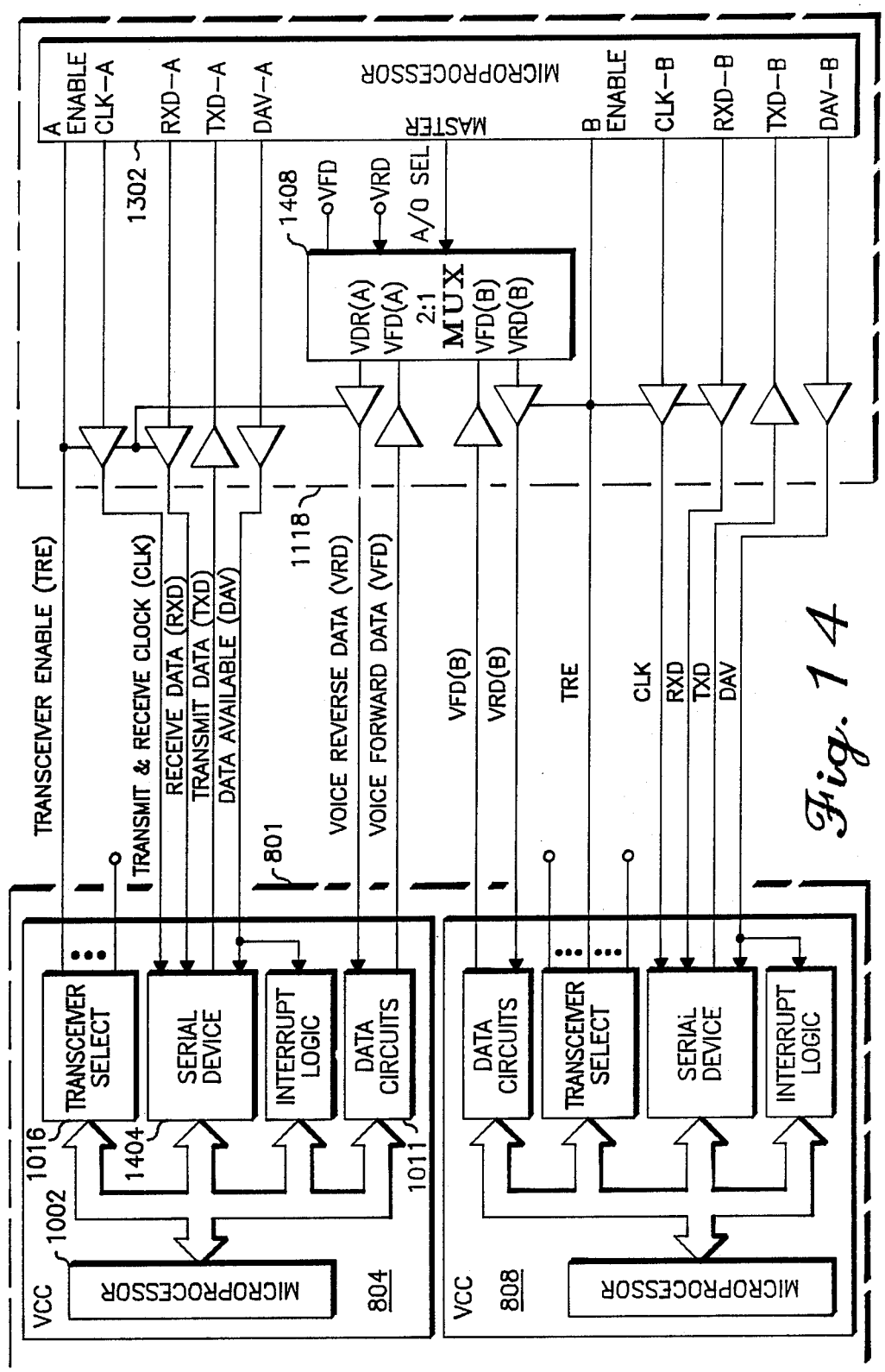
FIG. 14 is a detailed block diagram of the interface between a redundant VCC arrangement and one of a possible many voice channel transceivers which may be employed in the present invention.

The bus interface between the base site controller (BSC) 801 and one of the plurality of voice channel transceivers 812 is detailed in FIG. 14. The bus from VCC 804 consists of the following lines paralleled to each voice channel transceiver: Transmit & receive clock (CLK), Receive data (RXD), Transmit data (TXD), Data available (DAV), Voice reverse data (VRD), and Voice forward data (VFD). In addition, a unique line (Transceiver enable—TRE) is connected between each one of the transceivers (32 transceivers maximum in the preferred embodiment) and the serving VCC. The TRE signal is asserted by the VCC and is used to initiate communications with the transceiver. Assertion of this signal enables tri-statable receiver and transmitter devices in the transceiver. Tri-statable logic devices support the standard binary signal values (0+1), but include a third state, "off". In the "off" state these devices place their outputs in a floating (high impedance) condition, thus allowing many devices to be commonly connected to a "party line" type bus. The TRE signal is also used to hold open the voice forward data path. On command from the VCC, the transceiver microcomputer routes data into the transmit and receive circuits for the purpose of establishing a communications path between the VCC and mobile unit. Upon deactivation of the enable (TRE) signal the transceiver microcomputer automatically restores the routing to audio paths between the mobile subscriber and control terminal (420). The CLK signal is generated and asserted via the microcomputer of the transceiver and is used to clock data into and out of the serial communications device 1404 of the VCC. (This serial device consists of elements SSDA 1006 and voice transceiver interface 1008 described earlier). The RXD and the TXD signals are, respectively, the serial data that is transmitted from the transceiver to the VCC and the serial data that is transmitted from the VCC to the transceiver. The DAV signal is asserted by the transceiver to indicate to the VCC that a signal strength measurement request has been processed and that the results of that request are ready for inspection by the VCC. The VRD signals are generated by a conventional logic 2:1 multiplexer (mux) 1408 and received by data circuits 1011. Likewise the UFD signals are generated by data circuits 1011 and received by mux 1408.

An identical but separate bus structure is employed between each transceiver and backup VCC808, the selection of which VRD/VFD receiving data being decided by microprocessor 1302 and implemented by mux 1408.

Figure 15:
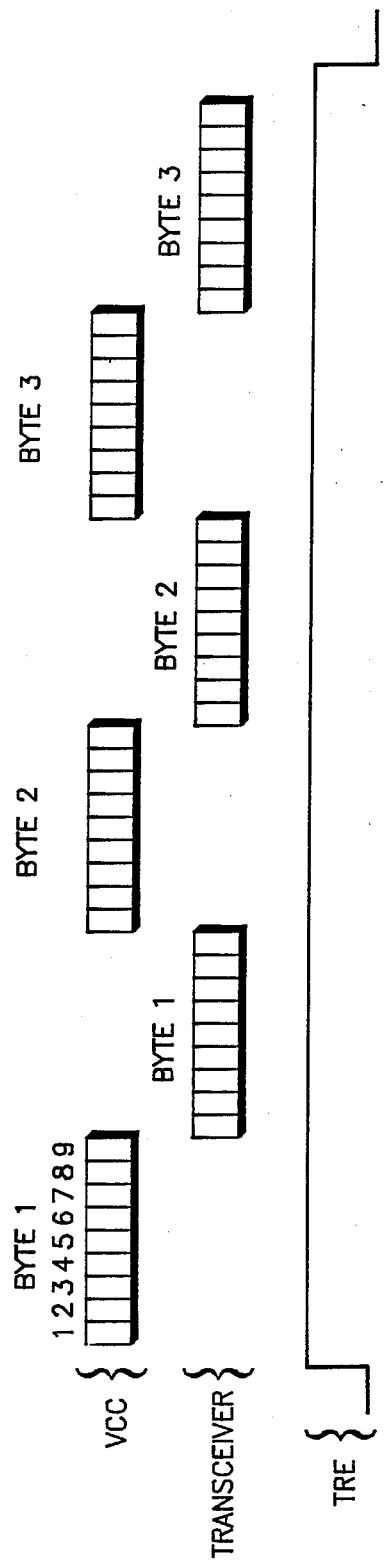
FIG. 15 is a relative timing diagram of the VCC to transceiver information exchange.

In the preferred embodiment of the present invention exactly three bytes of data are transmitted and received on each message transaction between a transceiver and a VCC on the TXD and RXD lines. Each byte is eight bits long with a parity bit added at the end of the byte to make the total nine bits per byte as shown in FIG. 15. Thus, 27 bits of information are sent in both directions (exclusive of any opening flags). Within the first byte of each message is a message type which instructs the VCC or the transceiver on what action to take on the data that is included in the message. The message types which may be employed in the present invention are:

| MSG TYPE | DESCRIPTION |
| --- | --- |
| | VCC to XCVR MESSAGES |
| 0001PPPV | Download/Master message. |
| 0010XXXX | Poll message and maintenance state update. |
| 0011XXXA | Program frequency synthesizer. This message. |
| 0100XSSA | Program frequency synthesizer and do signal strength measurement. |
| 0101ABCD | Audio Command message. |
| 0110ALCR | Audio Command message/program spare bits message. |
| | XCVR restart command. Restarts XCVR within 0.5 milliseconds. |
| 1000XXSO | Download delay for SAT integration time. |
| | XCVR VCC MESSAGES |
| 0001ABCD | Current XCVR status. |
| 0010ABCD | Alarm message/10KHz detect. |
| 0011XXXX | SSI Response. |

Where characters "A,B,C,D,P,S,Y" indicate information fields within the message and "X" indicates a don't care.

Additional information, such as frequency at which to program the synthesizer, signal strength measurement value, or specific alarm location reports are included in the body of the message as fields within the next two bytes transmitted.

Message types are optimized where possible to reduce the number of messages that are sent between the VCC and the transceiver by use of conventional bit-map assignment of message type (e.g. decoding if individual bits within the message).

Returning now to FIG. 15, when a VCC wishes to send a message to a transceiver, the TRE line is caused to go active (low). The VCC then begins to transmit the message using the clock supplied by the enabled transceiver microcomputer after the TRE line is asserted. The transceiver senses the active TRE line in microprocessor 1302 and returns a mimiced copy of the data to the serial device 1404 in the VCC. The serial device 1404 provides an interrupt signal to VCC central processing unit (CPU) 1002 for each byte that was correctly received. The VCC CPU 1002 accumulates the correctly received bytes until three such bytes have been received. The TRE line to the transceiver is then forced high. If a parity error or receiver buffers overflow condition is detected by the VCC serial device 1404, the TRE line if forced high and the message is requeued for transmission at a later time. (Although the exchange of data messages is shown as time sequential, it need not be. The data bus is full duplex in the preferred embodiment and may exchange data quickly as the hardware can generate and process the data).

Figure 16:
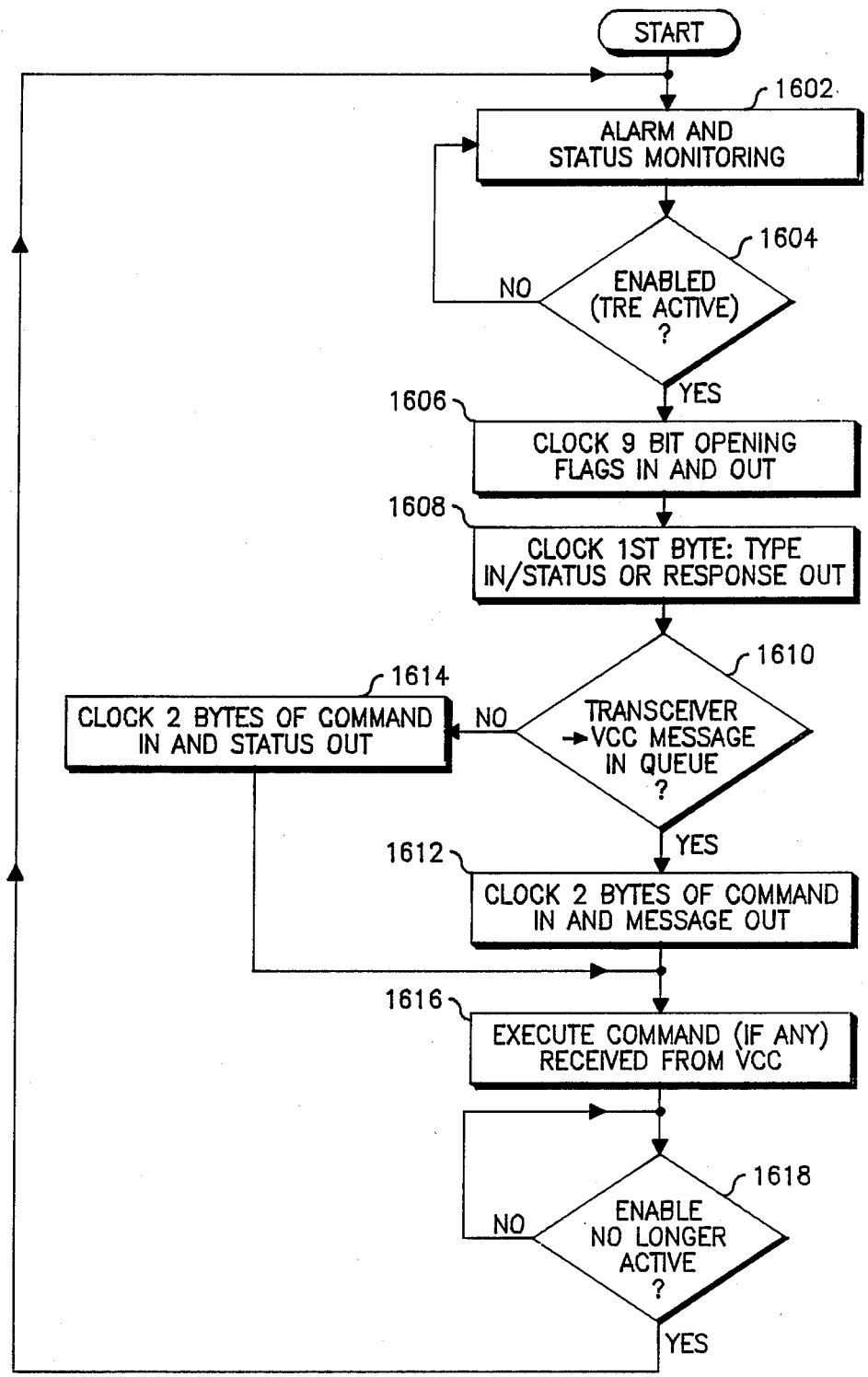
FIG. 16 is a flowchart of the VCC—transceiver message exchange process.
Figure 17:
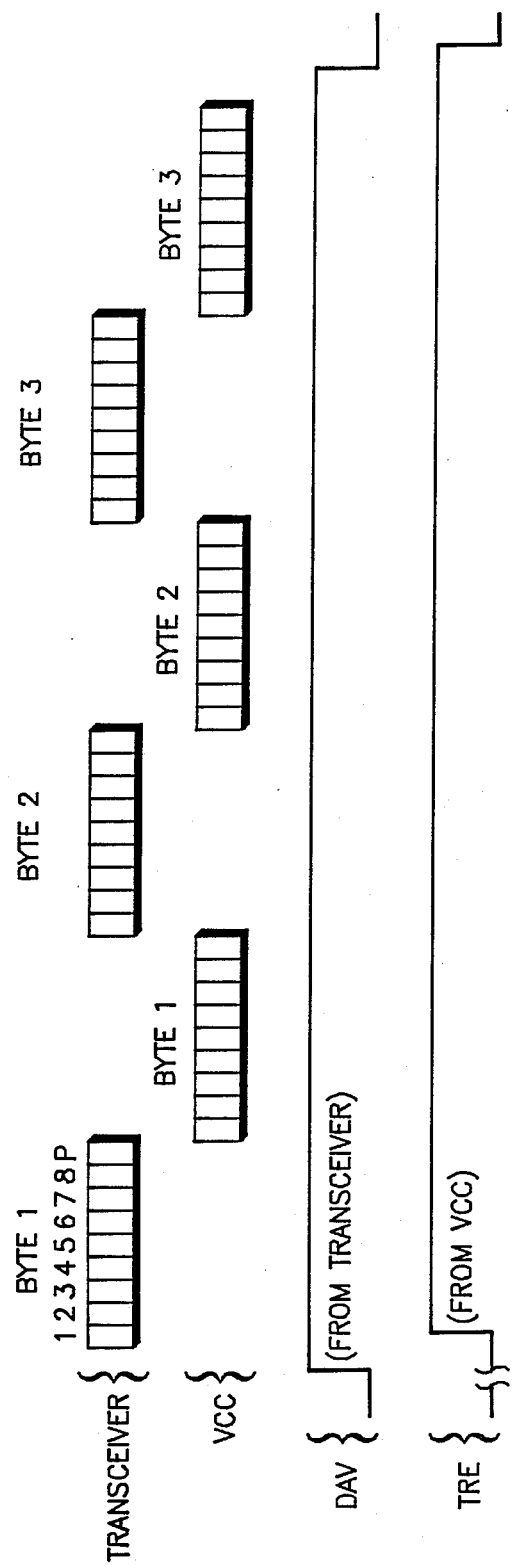
FIG. 17 is a relative timing diagram of the transceiver initiated message exchange.

At the transceiver, the microprocessor control program message subroutine accumulates correctly received bytes until three bytes have been received. This process is shown in the flowchart of FIG. 16. The microcomputer monitors the transceiver's alarm lines and message (at 1602). It randomly checks (whenever it is not monitoring alarms) the enable signal (at 1604) and if the transceiver is enabled, it beings clocking the flags in and out (at 1606), and clocks out the message type in the first byte of the message (at 1608). The transceiver microcomputer needs to check its own queue, when it is enabled, to see if there is a response from previous message that requires a response (at 1610). If the transceiver has information in the queue to return, the transceiver returns that informatioin (at 1612). Otherwise, if there is nothing in the queue), the transceiver (1614) clocks the remainder of the status into the message (at 1614). Thus, even if no message is to be transmitted, the VCC still gets some information from the transceiver and can maintain a table of transceiver status. If the transceiver receives a new command from the VCC, it executes the command (at 1616), waits until the enable is gone (at 1618), and returns to the normal operating mode.

A similar set of events occurs when a message is to be sent from the transceiver to the VCC as shown in FIG.

17. The DAV line is caused to go active and the VCC is alerted to begin transceiver interrogation.

Figure 18:
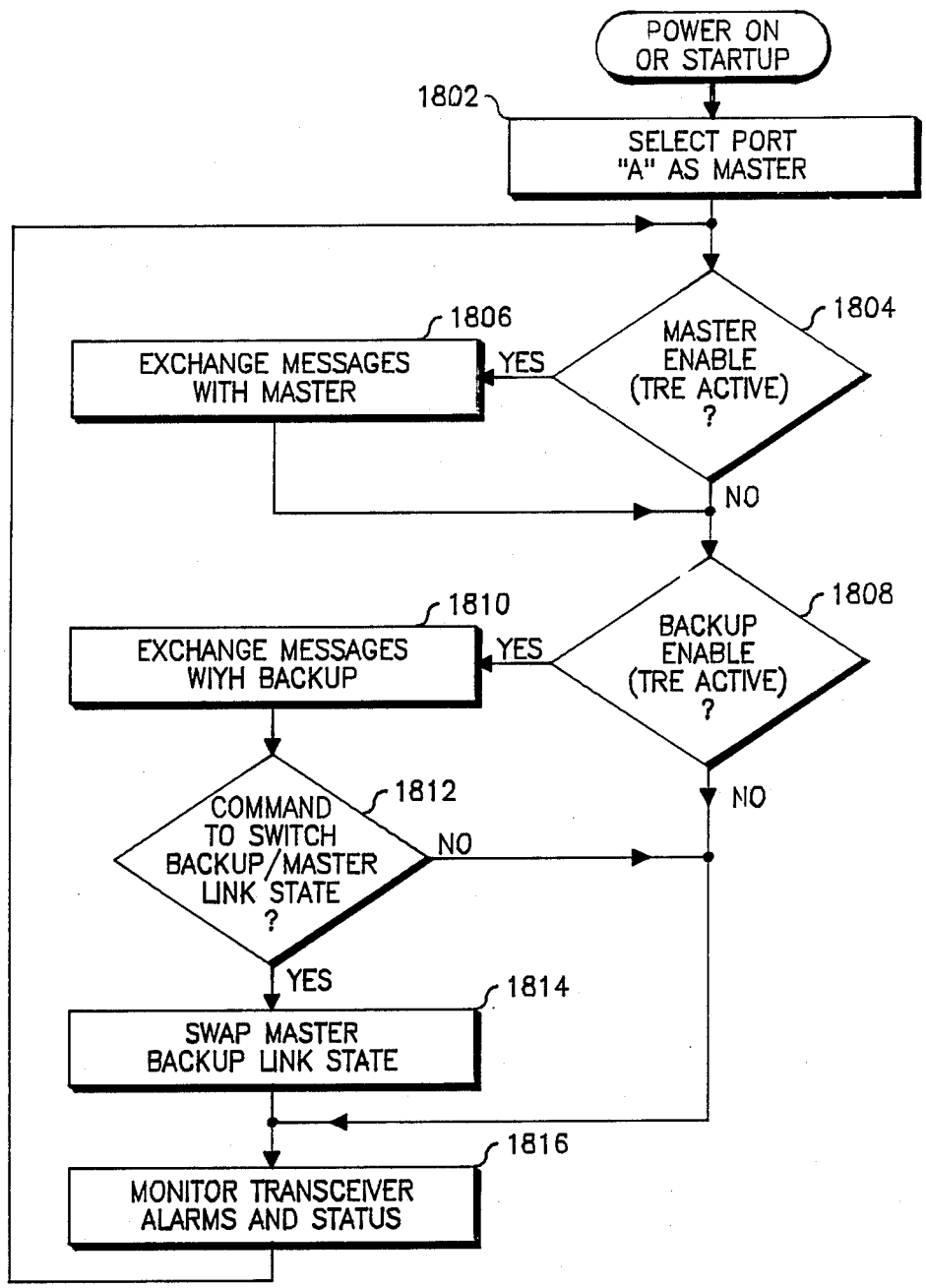
FIG. 18 is a flowchart of the master port prioritization process.

The transceiver in the preferred embodiment may have hardware enabling it to communicate with two VCCs. One VCC will always have control of the transceiver (the master VCC) and is allowed to send data messages to the remote units via the transceiver data path. The transceiver firmware always prioritizes the master port in all communications as shown in the process of FIG. 18. Upon power-up or start-up the master port of the transceiver/VCC interface is selected (at 1802). When the transceiver finishes the alarm monitoring routine, it checks to see if it is enabled (at 1804). If the transceiver is enabled, it checks the master port and if there are any waiting messages, it services these messages (at 1806). Otherwise the transceiver checks the backup port (at 1808) and services it (at 1810). Thus, the transceiver assumes after a reset that port A is master and starts there. The transceiver may then check to see if the backup VCC requested the transceiver to reconfigure (at 1812) and, if so, the transceiver swaps master and backup VCCs (at 1814) and returns to alarm monitoring (at 1816). The transceiver microcomputer, therefore, prioritizes the master link (over the backup) by always servicing the master link first.

The message type Poll-0010 is sent to the transceiver in a normal message transaction which merely requests the status of the transceiver to establish which port is connected to the master VCC. Thus, it is possible to change the master port by using a download message from a VCC. This means that the backup VCC becomes the master and vice versa.

A unique feature of the base site controller (BSC) of the present invention is that of its ability to receive a part or all of its instruction set via its interface with the central controller or with other BSCs. The process of receiving instruction sets, here, is called code downloading. There are several reasons why a processor would need a code download. The first is the case in which the microprocessor of the cell site controller (CSC) has no instruction set at all. This would be the case when the unit if first installed or replaced. Another occasion for code downloading would be for software upgrade. Another possible reason for code downloading would be occasioned by brief power surges or interruptions which could destroy parts, but not necessarily all, of the instruction set. In this last instance, it is possible that only a partial download would be necessary to repair the destroyed code.

Each microprocessor in the system which can potentially be downloaded (CPU 902 in the CSC, CPU 1002 in the VCC and microprocessor 1302 in the transceiver, for example has a bootstrap ROM (904, 1004, 1308) which contains enough information to enable the code download process to function. When a candidate microprocessor comes out of a reset state, if first checks the "start code" and "end code" pointers of its instruction set for each page of memory to see if they are within a predetermined range. In this manner, the processor has crudely determined if the pointers make sense. If this test fails, the processor continues with initialization tasks with the knowledge that a code download will be necessary. If the pointers seem valid, the next step is to check the address names given by these pointers for each page of memory to see if valid code exists there. Each of these ranges are broken into equal size segments over which a checksum was calculated at a previous download time and saved in semi-permanent memory. Now, the checksums are recalculated over each memory segment and compared against table entries to determine whether the code is good in all cases. At this point, the initialization sequence continues with the processor knowing whether or not the code is intact.

After initialization, the processor waits for a START INIT message to be received. This message signals the start of the final initialization sequence necessary to bring the processor into full operation and as such contains several parameters. Among these is a code version number and a flag which indicates forced download. Upon arrival of this message, the processor checks the results of the previous memory check and determines if a code load is necessary. If it shows that memory is good, and the START INIT messages shows no forced download, then the normal initialization sequence continues. However, if a further check reveals that the code version number from the START INIT message does not match that contained in the processor from the last code load, a warning will be sent back to the central controller. A version mismatch is not fatal since since the code is functional. It is the responsibility of the central controller to determine whether a new code download is actually necessary. If the processor has determined that the memory is corrupted or if a forced code download is indicated, then a message is sent back to the intializating device "MEMORY ERROR". At this point a code download will begin.

Up to this point, the sequence for all processors is the same. However, the code downloading sequence differs slightly several of the different scenrios. This is due to the fact that a code download can come from another BSC processor (a "crossload") or from the central controller (a "download"). Furthermore, a BSC can receive code from either another BSC or from the central controller, or as a master BSC, can be used to oversee a crossload from one processor to another, or to oversee a download from the central controller to another processor. A CSG has none of these complications since it always communicates through the master BSC in any case and as such represents a subset of the download/crossload management code of the BSC. Since the protocol differs slightly for the different cases, each will be discussed separately below.

Figure 19A:
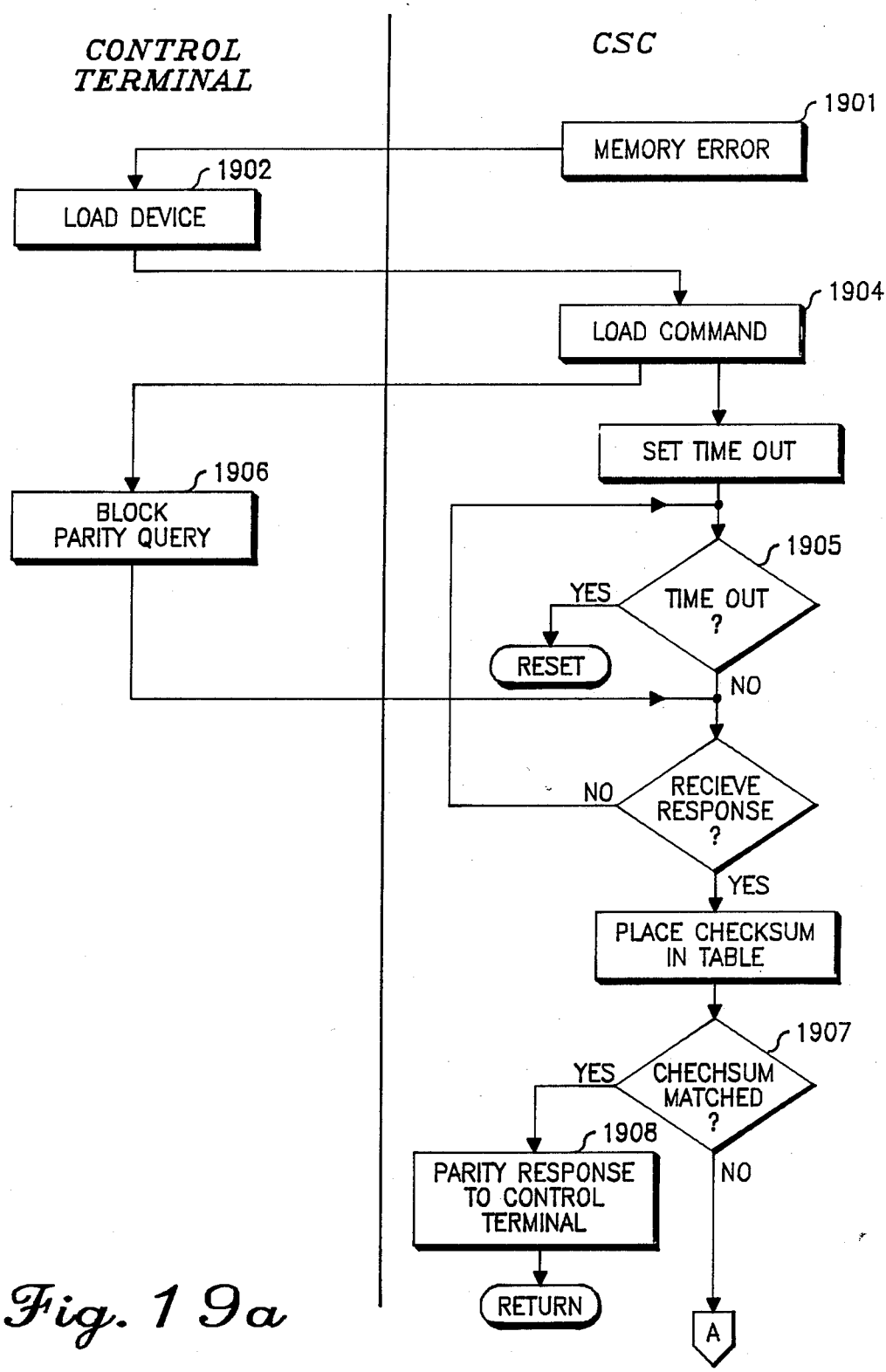
FIG. 19a and 19b are a flowchart of the download process between the cell system central controller and a cell site controller.
Figure 19B:
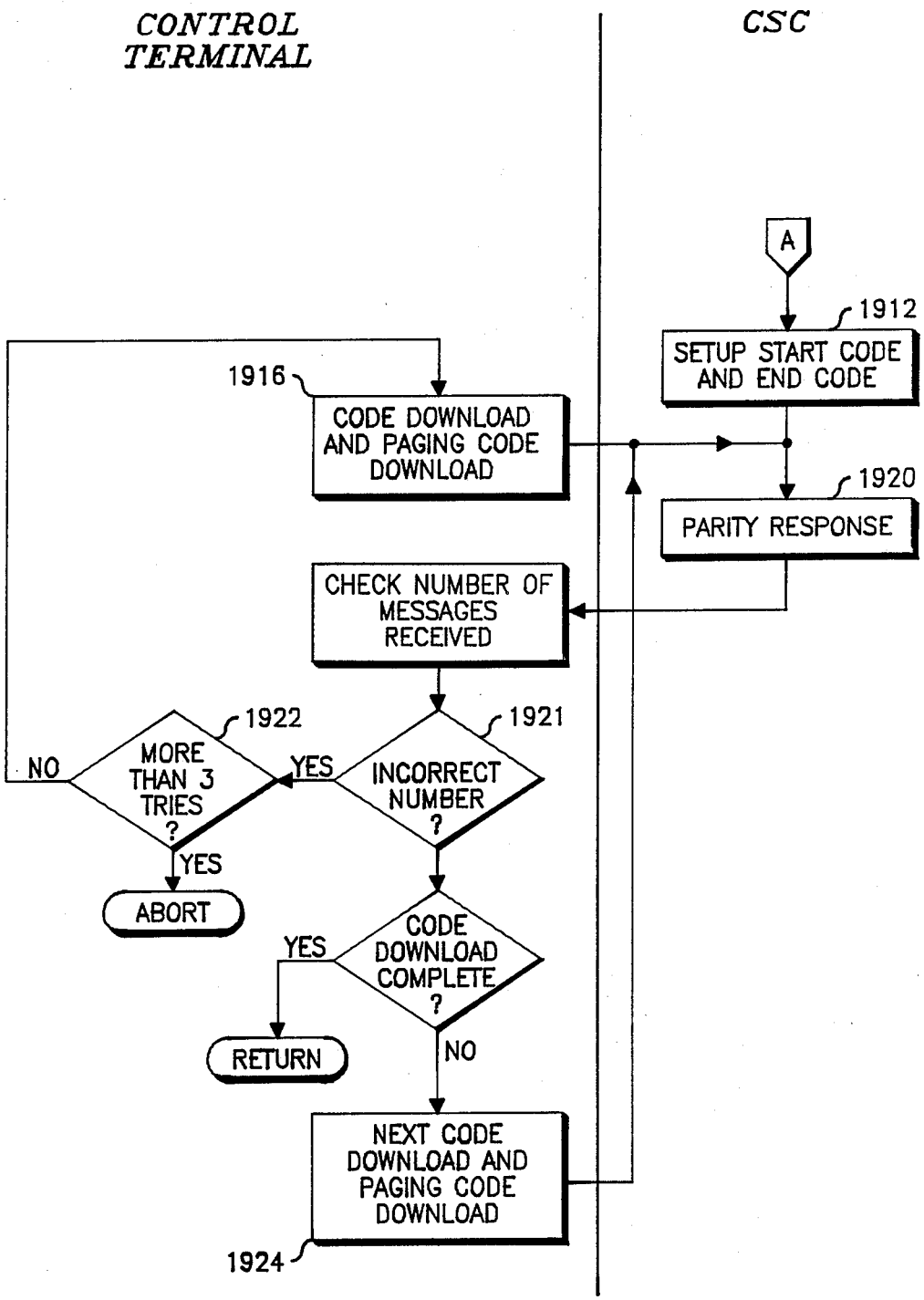

For the first case, shown in FIG. 19, assume the central controller is directly downloading a CSC. This case would occur if neither of the CSCs had a valid code necessitating the load of one of the two before the site can be brought up. After the CSC has sent in the MEMORY ERROR message 1901, the central controller sends down a LOAD DEVICE 1902 message. This message has fields which specifies the central controller as the source of the code, that the device to be loaded is a CSC, and that this is the CSC which is to be loaded. The CSC responds immediately with a LOAD COMMAND RESPONSE 1904 message indicating that all is ready for accepting the download and sets a timeout for the response. If the timeout occurs (at 1905), the processor will reset and the download sequence must be restarted. The central controller will respond to the message with a BLOCK PARITY QUERY 1906 over the first memory segment on the first memory page. This message contains a starting address, an ending address and a checksum. The CSC receives the message, places the new checksum in the checksum table, and checks to see of this matches the checksum calculated over the given range (at 1907). The CSC sends the result of the match back to the central controller via the PARITY RESPONSE 1908 message. If the checksums do not match, the code needs to be loaded for this block. The CSC takes special note of the first BLOCK PARITY QUERY 1906 message received for each page of memory since this is used to set up the START CODE pointer 1912 for that page of memory and also signifies that the last ending address given for the previous page loaded (if this is not the first page) is the END CODE pointer for that page of memory.

If the block needs to be loaded, the central controller sends out a burst of CODE DOWNLOAD messages followed by a single PACING CODE DOWNLOAD (at 1916) message. The contents of each of these messages are a starting address, a transfer byte count, and data to be loaded. As the CSC receives these messages off the SDLC link, an SDLC link is a synchronous serial data link, using a subset of the industry standard ADLC (high level data link control) protocol, the data contents are loaded into memory. After the last message of the group has been received (which is noted by a PAGING CODE DOWNLOAD message), a PARITY RESPONSE 1920 message is sent indicating a pacing response (as opposed to a response to a BLOCK PARITY 1922 message), and giving the number of CODE DOWNLOAD messages received since the last PACING CODE DOWNLOAD message. The number of messages received is checked in the central controller (at 1921). If not correct, the central controller re-transmits the group of messages for up to three retries (checked at 1922) after which the download will be aborted. If all is correct, the next burst of messages is sent (at 1924). This block is loaded, the central controller sends another BLOCK QUERY message down over that area to determine if it was successfully loaded. If not, the block is retried up to three times after which time the download is cancelled if not successful. If the block was loaded, a BLOCK QUERY message is sent for the next block or memory.

Notice that code transfer involves a handshake protocol between the central controller and the CSC in that the next group of CODE DOWNLOAD messages is not sent out until a response from the previous group is received. This is because the central controller may have a limited pool of message buffers into which the messages may be sent, making a continuous stream of download messages impossible. Using the above method, the central controller sends as many messages as it can in one burst and waits for confirmation that they have all been received (i.e., all the message buffers have been returned) before sending out more. This results in a high percentage of link utilization which is necessary for maximum transfer rate as the transfer rate automatically adjusts to the SDLC link traffic.

When all blocks of memory have been loaded, the central controller sends down a second START INIT message. The CSC receives this, recognizes that the download is complete, sets up the END CODE pointer for the last page of memory, and site intialization continues as normal from this point.

Figure 20A:
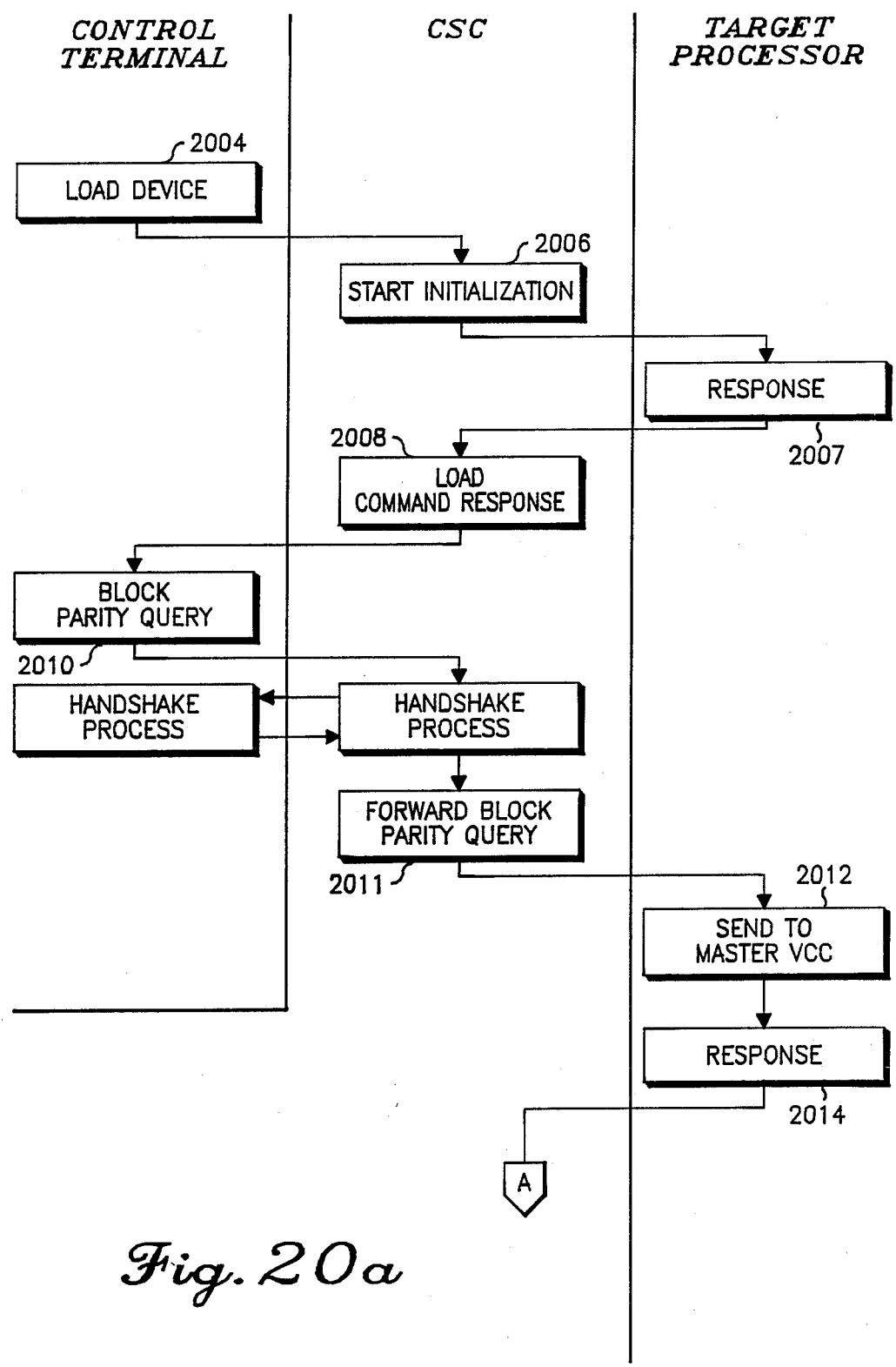
FIGS. 20a and 20b are a flowchart of the crossload process between a master cell site controller and a peripheral target processor.
Figure 20B:
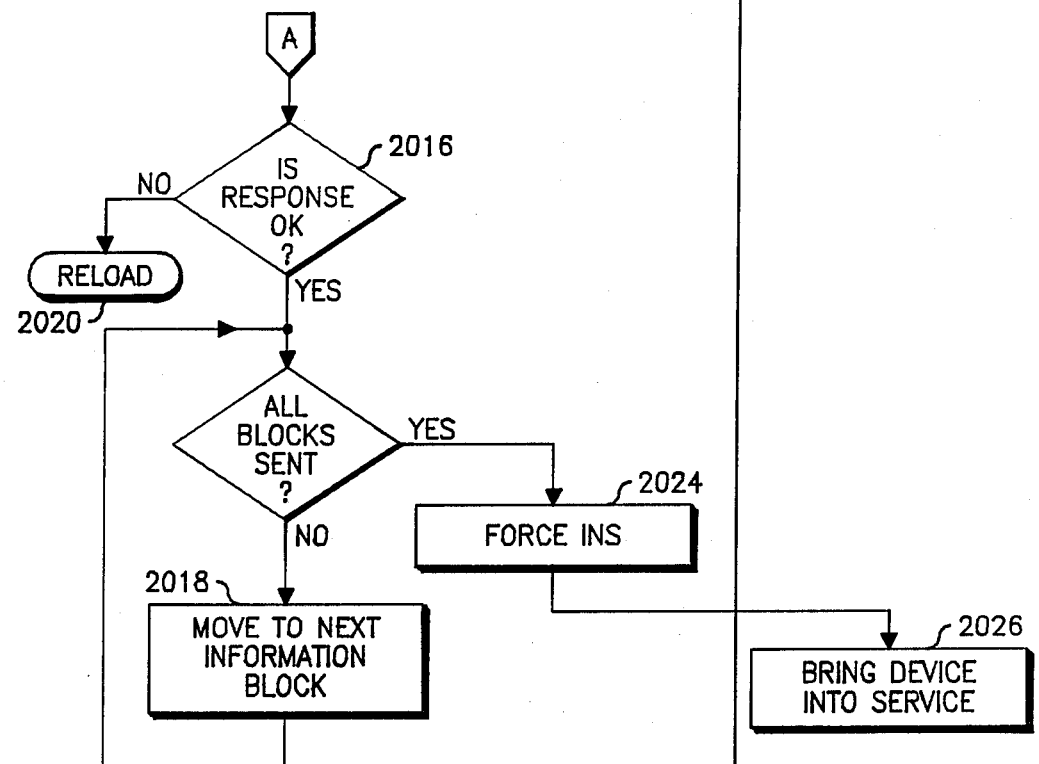

Another class of cases is illustrated in the process of FIG. 20. Here, the central controller downloads a CSC or VCC via the master CSC. In this case, the cell is operational (which means that at least the master CSC is in service) and the processor to be downloaded is out of service. The load begins with the central controller sending a LOAD DEVICE 2004 message to the master CSC. The message contains the processor type to be loaded, the processor number, and a flag which indicates (in this case) that the central controller is the source of the load. The master CSC then sends a START INIT message 2006 to the target processor. When the target processor (VCC or backup CSC) sends back its response 2007 to the START INIT, the CSC sends the central controller LOAD COMMAND RESPONSE 2008 message informing it the target processor is ready for the code download. Because of automatic re-routing of call processing messages, the central controller cannot send any message directly to the target processor, therefore, all messages must be sent to the CSC master ad relayed from there to the target device. The first message the central controller sends is the BLOCK PARITY QUERY 2010 message. The handshake that occurs is the same as above except that the CSC is now relaying messages between the central controller and the target device. The CSC gets the BLOCK PARITY QUERY message and forwards it (at 2011) to the target device. The target in turn sends the response to the query to the master VCC at 2012 and forwards the response the central controller at 2014. If the block is OK as determined at 2016, the central controller moves to the next block at 2018. If not, a load is begun at 2020 on that block of code following the process given above with the master CSC as a relay point.

When all blocks have been loaded, the central controller sends the master a FORCE INS 2024 message for the device to be brought into service at 2026. The master CSC then sends a START INIT message to the target device. This tells the device that download is now ended and the END CODE pointer for the last page of memory loaded can be set up. From this point the initialization of the device continues as normal.

A third class of cases involves a crossload between two like devices. Again, a master CSC oversees the crossload process. The master CSC receives a LOAD DEVICE message either from the local monitor or the central controller. This message specifies which target device is to be loaded, that this is a crossload, and which device is the source of the crossload. The CSC then verifies that the target device is out of service and the source device in in service. If so, the CSC sends a START INIT message to the target device and waits for a response. When it is received, the target is ready to accept a crossload. The master now sends a message to the source device (unless the master is the source device) to begin crossloading the code. The source device begins by sending a BLOCK PARITY QUERY to the master CSC which in turn relays to the target device. The target device then sends its response to the master CSC which in turn relays it to the source device. If the block was OK, another BLOCK PARITY QUERY is sent for the next block of code. Otherwise a code load is done for the block.

Since there exists redundant paths between processors, the use of both paths to carry the CODE DOWNLOAD messages nearly doubles the speed of the transfer. Therefore, when crossloading VCCs and CSCs, every other message is sent out the alternate communications path. If one of these paths is down, the communication package will reroute the messages to the one remaining path without the loss of messages.

After the source device has crossloaded all blocks, a CROSSLOAD DONE message is sent to the CSC which notes that the transfer is complete. The CSC also relays this message to the central controller and to the target device so that the target can mark its END CODE pointer and thus complete the code transfer.

In summary, then, the method and apparatus for interfacing between a cell site controller, a cell system controller, and the radio transceivers of a cellular radiotelephone system has been shown and described. To convey control information to the radio transceivers, the cell site controller enables one of redundant pair of control data buses to a selected transceiver by placing an enable signal on the enable line unique to the selected transceiver. Control data is then coupled to the common enabled control data bus for conveyance to the selected transceiver. The transceiver mutes the message data port it may be using and transponds the control data information it receives. When the enable signal is removed, the transceiver unmutes the message data port. Program information is transferred between the cell system controller and cell site controllers or between cell site controllers as memory blocks which may be retransferrred upon detection of a checksum mismatch. Therefore, while a particular embodiment of the invention has been shown and described, it should be understood that the invention is not limited thereto since modifications unrelated to the true spirit and scope of the invention may be made by those skilled in the art. It is therefore contemplated to cover the present invention and any and all such modifications by the claims of the present invention.

We claim:

1. A method of correcting a portion of the control program of a cell site controller in a cellular radiotelephone system by conveying a corrected portion of the control program between a central controller and the cell site controller, comprising the steps of:

determining that a memory error has occurred in a stored portion of the control program starting a first memory address and ending at a second memory address of the cell site controller;

transmitting said first memory address and said second memory address and an associated first checksum from the central controller to the cell site controller;

calculating a second checksum for said stored portion of the control program at the cell site controller starting at said first memory address and ending at said second memory address;

comparing said first calculated checksum to said second calculated checksum at the cell site controller; and transmitting said control program starting at said first memory address and ending at said second memory address from the central controller to the cell site controller if said comparison yields a substantial mismatch.

2. A method of correcting in accordance with the method of claim 1 wherein said determining step further comprises the step of comparing a previously generated checksum of said portion of the control program to said checksum.

3. A method of correcting a portion of control program of a cell site controller in a cellular radiotelephone system by conveying a corrected portion of the control program between a first cell site controller and a second cell site controller , comprising the steps of:

determining that a memory error has occurred in a stored portion of the control program starting at a first memory address and ending at a second memory address of the second cell site controller;

transmitting said first memory address and said second memory address and an associated checksum from the first cell site controller to the second cell site controller;

calculating a second checksum for said stored portion of the control program at the second cell site controller starting at said first memory address and ending at said second memory address;

comparing said first calculated checksum to said second calculated checksum at the second cell site controller; and transmitting said control program starting at said first memory address and ending at said second memory address from the first cell site controller to the second cell site controller if said comparison yields a substantial mismatch.

4. A method of correcting in accordance with the method of claim 3 wherein said determining step further comprises the step of comparing a previously generated checksum of said portion of the control program to said second checksum.

* * * * *

UNITED STATES PATENT AND TRADEMARK OFFICE
CERTIFICATE OF CORRECTION

PATENT NO. : 4,843,633

DATED : June 27, 1989

INVENTOR(S) : Barry J. Menich, Daniel E. Wood, Daniel R. Tayloe, Jeff D. Bonta, Valy Lev It is certified that error appears in the above-identified patent and that said Letters Patent is hereby corrected as shown below:

Column 18, line 12 insert --second-- between "said" and "checksum".

Signed and Sealed this

Eighteenth Day of September, 1990

*Attest:*

HARRY F. MANBECK, JR.

*Attesting Officer*      *Commissioner of Patents and Trademarks*